United States Patent
Fukushima

(10) Patent No.: US 9,703,995 B2
(45) Date of Patent: Jul. 11, 2017

(54) PORTABLE TERMINAL, IMAGING APPARATUS, COMMUNICATION SYSTEM, COMMUNICATION METHOD OF PORTABLE TERMINAL, COMMUNICATION METHOD OF IMAGING APPARATUS, AND COMPUTER READABLE STORAGE DEVICE

(71) Applicant: OLYMPUS CORPORATION, Tokyo (JP)

(72) Inventor: Keito Fukushima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 42 days.

(21) Appl. No.: 14/559,629

(22) Filed: Dec. 3, 2014

(65) Prior Publication Data

US 2015/0334284 A1 Nov. 19, 2015

(30) Foreign Application Priority Data

May 16, 2014 (JP) ................................. 2014-102776

(51) Int. Cl.
*H04N 5/232* (2006.01)
*G06K 7/10* (2006.01)
(Continued)

(52) U.S. Cl.
CPC ......... *G06K 7/10009* (2013.01); *G08C 17/02* (2013.01); *H04B 5/0031* (2013.01);
(Continued)

(58) Field of Classification Search
CPC .............. G06K 7/10009; H04B 5/0031; H04B 5/0056; H04B 5/0062; H04W 76/02;
(Continued)

(56) References Cited

U.S. PATENT DOCUMENTS

| 7,102,671 B1* | 9/2006 | Asnaashari ........ H04N 1/00204 348/231.9 |
| 2001/0051530 A1* | 12/2001 | Shiotsu ................. H04W 16/14 455/522 |

(Continued)

FOREIGN PATENT DOCUMENTS

| CN | 102144421 A | 8/2011 |
| JP | 2004-030063 A | 1/2004 |

(Continued)

OTHER PUBLICATIONS

Re: Kayo-System, Android, NFC Programing Perfect Guide first edition, Shoeisha.Co.,Ltd, Sep. 12, 2013, first edition, p. 145, cited in Japanese Notice of Reasons for Rejection dated Mar. 17, 2015 with English translation (2 pages).

(Continued)

*Primary Examiner* — Hung Lam
(74) *Attorney, Agent, or Firm* — Westerman, Hattori, Daniels & Adrian, LLP

(57) ABSTRACT

A portable terminal having a wireless local area network (WLAN) communication module configured to perform wireless communication in a WLAN and a near field communication (NFC) module configured to read written data written to an integrated circuit (IC) tag includes: a memory configured to record format identification data for identifying a data format of the written data; and a control unit configured to detect whether the written data read using the NFC module has a predetermined format based on the format identification data, detect whether the written data is WLAN setup data for use in an imaging-apparatus-side WLAN module, and write command data for instructing to activate an access point (AP) function of the imaging-apparatus-side WLAN module to the IC tag using the NFC (Continued)

module when it is detected that the written data detected as having the predetermined format is the WLAN setup data.

9 Claims, 17 Drawing Sheets

(51) Int. Cl.
| | |
|---|---|
| *H04B 5/00* | (2006.01) |
| *G08C 17/02* | (2006.01) |
| *H04W 76/02* | (2009.01) |
| *H04W 52/02* | (2009.01) |
| *H04W 84/12* | (2009.01) |

(52) U.S. Cl.
CPC ......... *H04B 5/0056* (2013.01); *H04B 5/0062* (2013.01); *H04N 5/23206* (2013.01); *H04W 52/02* (2013.01); *H04W 52/0293* (2013.01); *H04W 76/02* (2013.01); *H04W 76/021* (2013.01); *H04W 84/12* (2013.01); *Y02B 60/50* (2013.01)

(58) Field of Classification Search
CPC ... H04W 52/02; H04W 76/021; H04W 84/12; H04N 5/23206; G08C 17/02
USPC .............................. 725/105; 348/14.02, 211.1
See application file for complete search history.

(56) References Cited

U.S. PATENT DOCUMENTS

| | | | | |
|---|---|---|---|---|
| 2009/0233551 | A1* | 9/2009 | Haartsen | G01S 5/00 455/41.3 |
| 2010/0130125 | A1* | 5/2010 | Nurmi | H04M 1/7253 455/41.1 |
| 2010/0167643 | A1* | 7/2010 | Hirsch | H04L 63/18 455/41.1 |
| 2014/0128031 | A1* | 5/2014 | Park | H04L 63/18 455/411 |

FOREIGN PATENT DOCUMENTS

| | | |
|---|---|---|
| JP | 2006-253887 A | 9/2006 |
| JP | 2013-122684 A | 6/2013 |
| JP | 2013-157737 A | 8/2013 |
| JP | 2014-082756 A | 5/2014 |

OTHER PUBLICATIONS

Notice of Reasons for Rejection dated Mar. 17, 2015, issued in corresponding Japanese Patent Application No. 2014-102776 with English translation (12 pages).

Freed et al., "Multipurpose Internet Mail Extensions (MIME) Part Two: Media Types", First Virtual, RFC 2046, Nov. 1996, 40 pages; cited in the Specification.

Office Action dated Feb. 22, 2017, issued in counterpart Chinese Patent Application No. 201510240619.4, with English translation. (16 pages).

\* cited by examiner

PORTABLE TERMINAL, IMAGING APPARATUS, COMMUNICATION SYSTEM, COMMUNICATION METHOD OF PORTABLE TERMINAL, COMMUNICATION METHOD OF IMAGING APPARATUS, AND COMPUTER READABLE STORAGE DEVICE

BACKGROUND OF THE INVENTION

Field of the Invention

The present invention relates to a portable terminal, an imaging apparatus, a communication system, a communication method of the portable terminal, a communication method of the imaging apparatus, and a computer readable storage device.

Priority is claimed on Japanese Patent Application No. 2014-102776, filed May 16, 2014, the content of which is incorporated herein by reference.

Description of Related Art

An imaging apparatus to be activated in a mode based on a detected signal when a near field communication (NFC) tag is detected is known (for example, see Japanese Unexamined Patent Application, First Publication No. 2006-253887).

In addition, when an external terminal (for example, a portable terminal) accesses an NFC tag, an imaging apparatus having an access point (AP) for activating a wireless function (wireless local area network (WLAN)) is known.

SUMMARY OF THE INVENTION

According to a first aspect of the present invention, there is provided a portable terminal having a WLAN communication module configured to perform wireless communication in a WLAN and an NFC module configured to read written data written to an integrated circuit (IC) tag, the portable terminal including: a memory configured to record format identification data for identifying a data format of the written data; and a control unit configured to detect whether the written data read using the NFC module has a predetermined format based on the format identification data, detect whether the written data is WLAN setup data for use in an imaging-apparatus-side WLAN module, and write command data for instructing to activate an AP function of the imaging-apparatus-side WLAN module to the IC tag using the NFC module when it is detected that the written data detected as having the predetermined format is the WLAN setup data.

According to a second aspect of the present invention, in the portable terminal of the first aspect, the control unit may detect presence of the IC tag using the NFC module and writing of the command data to the IC tag may be performed before NFC communication with the IC tag, the presence of which is detected, is impossible after the written data is read.

According to a third aspect of the present invention, in the portable terminal of the first aspect, the control unit may perform a connection process of wireless communication by the WLAN communication module using the WLAN setup data only when the writing of the command data to the IC tag succeeds.

According to a fourth aspect of the present invention, in the portable terminal of the first aspect, the memory may record comparison data, and the control unit may identify whether the WLAN setup data is that of an imaging apparatus based on the comparison data and write command data for causing the imaging apparatus to start a remote imaging function, or write command data for causing to browse image data held by the imaging apparatus, to the IC tag when it is identified that the WLAN setup data is that of the imaging apparatus.

According to a fifth aspect of the present invention, an imaging apparatus has an imaging module, a WLAN communication module configured to perform wireless communication in a WLAN, and an IC tag connection port, the imaging apparatus including: a detection unit configured to detect that command data is newly written to an IC tag having a wired connection to the IC tag connection port; and a control unit configured to read the written command data and execute a process according to the read command data when it is detected that the command data is newly written to the IC tag and set the imaging module to an unavailable state when there is an error in the read command data.

According to a sixth aspect of the present invention, in the imaging apparatus of the fifth aspect, when there is no error in the command data, the control unit may execute a process according to the read command data and delete the command data written to the IC tag or write data for discriminating whether the process according to the command data is executed by the imaging apparatus to the IC tag.

According to a seventh aspect of the present invention, in the imaging apparatus of the fifth aspect, the control unit may write WLAN setup data for use in the WLAN communication module to the IC tag connected to the IC tag connection terminal and set the imaging module to an unavailable state when there is an error in the read command data only after the WLAN setup data is written.

According to an eighth aspect of the present invention, a communication system includes a portable terminal having a portable-terminal-side WLAN communication module configured to perform wireless communication in a WLAN and an NFC module configured to read written data written to an IC tag and an imaging apparatus having an imaging module, an imaging-apparatus-side WLAN communication module configured to perform wireless communication in the WLAN, and an IC tag connection port, wherein the portable terminal includes: a memory configured to record format identification data for identifying a data format of the written data; and a control unit configured to detect whether the written data read using the NFC module has a predetermined format based on the format identification data, detect whether the written data is WLAN setup data for use in the imaging-apparatus-side WLAN communication module, and write command data for instructing to activate an AP function of the WLAN module of the imaging apparatus side to the IC tag using the NFC module when it is detected that the written data detected as having the predetermined format is the WLAN setup data, and wherein the imaging apparatus includes: a detection unit configured to detect that command data is newly written to the IC tag having a wired connection to the IC tag connection port; and a control unit configured to read the written command data and execute a process according to the read command data when it is detected that the command data is newly written to the IC tag.

According to a ninth aspect of the present invention, a communication method of a portable terminal having a WLAN communication module configured to perform wireless communication in a WLAN and an NFC module configured to read written data written to an IC tag includes: a control step of detecting whether the written data read using the NFC module has a predetermined format based on format identification data for identifying a data format of the written data recorded by a memory, detecting whether the written data is WLAN setup data for use in an imaging-apparatus-side WLAN module, and writing command data for instructing to activate an AP function of the imaging-apparatus-side WLAN module to the IC tag using the NFC module when it is detected that the written data detected as having the predetermined format is the WLAN setup data.

According to a tenth aspect of the present invention, a communication method of an imaging apparatus having an imaging module, a WLAN communication module configured to perform wireless communication in a WLAN, and an IC tag connection port includes: a detection step of detecting that command data is newly written to an IC tag having a wired connection to the IC tag connection port; and a setting step of reading the written command data and executing a process according to the read command data when it is detected that the command data is newly written to the IC tag and setting the imaging module to an unavailable state when there is an error in the read command data.

According to an eleventh aspect of the present invention, a computer readable storage device saving a computer program for causing a portable terminal having a WLAN communication module configured to perform wireless communication in a WLAN and an NFC module configured to read written data written to an IC tag to execute: a control step of detecting whether the written data read using the NFC module has a predetermined format based on format identification data for identifying a data format of the written data recorded by a memory, detecting whether the written data is WLAN setup data for use in an imaging-apparatus-side WLAN module, and writing command data for instructing to activate an AP function of the imaging-apparatus-side WLAN module to the IC tag using the NFC module when it is detected that the written data detected as having the predetermined format is the WLAN setup data.

According to a twelfth aspect of the present invention, a computer readable storage device saving a computer program for causing an imaging apparatus having an imaging module, a WLAN communication module configured to perform wireless communication in a WLAN, and an IC tag connection port to execute: a detection step of detecting that command data is newly written to an IC tag having a wired connection to the IC tag connection port; and a setting step of reading the written command data and executing a process according to the read command data when it is detected that the command data is newly written to the IC tag and setting the imaging module to an unavailable state when there is an error in the read command data.

According to an aspect of the present invention, a portable terminal has a WLAN communication module configured to perform wireless communication in a WLAN and an NFC module configured to read written data written to an IC tag. A memory records format identification data for identifying a data format of the written data. In addition, a control unit detects whether the written data read using the NFC module has a predetermined format based on the format identification data, detects whether the written data is WLAN setup data for use in an imaging-apparatus-side WLAN module, and writes command data for instructing to activate an AP function of the imaging-apparatus-side WLAN module to the IC tag using the NFC module when it is detected that the written data detected as having the predetermined format is the WLAN setup data.

Through this configuration, it is detected whether the written data read using the NFC module has the predetermined format based on the format identification data, it is detected whether the written data is WLAN setup data for use in the WLAN communication module of the imaging apparatus, and command data for instructing to activate the AP function of the WLAN module of the imaging apparatus is written to the IC tag using the NFC module when it is detected that the written data detected as having the predetermined format is the WLAN setup data.

DETAILED DESCRIPTION OF THE INVENTION

Figure 1:
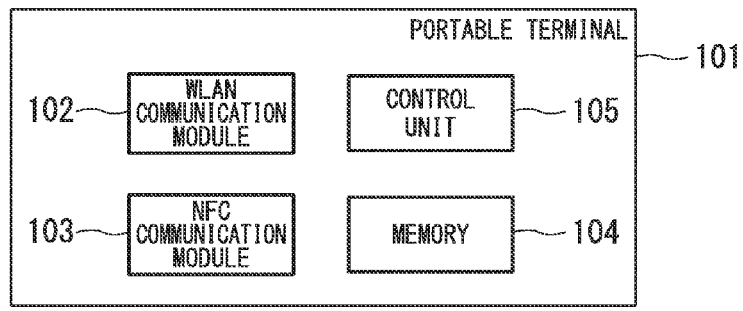
FIG. 1 is a block diagram illustrating a configuration of a portable terminal in an embodiment of the present invention.

Hereinafter, an embodiment of the present invention will be described with reference to the drawings. First, a configuration of a portable terminal will be described. FIG. 1 is a block diagram illustrating the configuration of the portable terminal in this embodiment. The portable terminal 101 includes a WLAN communication module 102 (WLAN communication module and portable-terminal-side WLAN communication module), an NFC communication module 103 (NFC module), a memory 104, and a control unit 105.

The WLAN communication module 102 is a communication module for performing data communication based on a communication standard such as Institute of Electrical and Electronics Engineers (IEEE) 802.11a/b/g/n or the like. In addition, the WLAN communication module 102 operates as a station of the WLAN. The NFC communication module 103 is a communication module for reading or writing data from or to the NFC tag based on a communication standard of NFC which is proximity wireless communication. In addition, the NFC communication module 103 causes the portable terminal 101 to operate as an NFC reader/writer.

The memory 104 includes a storage medium such as a random access memory (RAM), a flash memory, or a memory card which is an external storage medium, and various data is read and written according to each purpose of use. For example, the memory 104 stores format identification data (comparison data) for determining whether data read via the NFC communication module 103 has a specific format. In addition, for example, the memory 104 stores a control program for generally controlling the operation of each unit provided in the portable terminal 101. In addition, for example, the memory 104 stores data or the like which is exchanged by the WLAN communication module 102 or the NFC communication module 103.

The control unit 105 generally controls the operation of each unit provided in the portable terminal 101. For example, the control unit 105 determines whether data read via the NFC communication module has a specific format and determines an instruction command for the imaging apparatus based on a determination result. In addition, for example, the control unit 105 writes the determined instruction command to the NFC tag via the NFC communication module 103. Also, a display unit or operation unit (not illustrated) or the like is also included as a unit of which the operation is controlled by the control unit 105.

Figure 2:
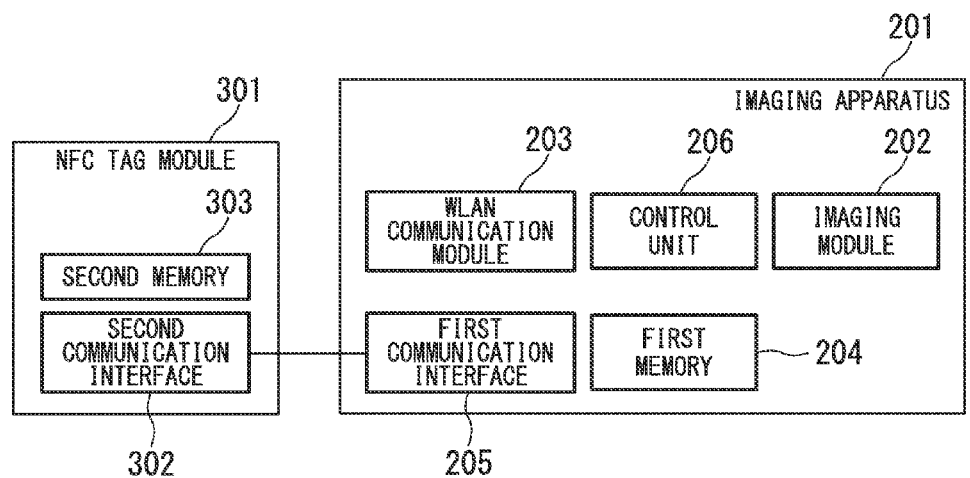
FIG. 2 is a block diagram illustrating configurations of an imaging apparatus and an NFC tag module in this embodiment.

Next, configurations of the imaging apparatus 201 and the NFC tag module 301 will be described. FIG. 2 is a block diagram illustrating the configurations of the imaging apparatus 201 and the NFC tag module 301 in this embodiment. The imaging apparatus 201 includes an imaging module 202, a WLAN communication module 203 (WLAN communication module and imaging-apparatus-side WLAN communication module), a first memory 204, a first communication interface 205 (IC tag connection port), and a control unit 206. The NFC tag module 301 (IC tag) includes a second communication interface 302 and a second memory 303. The first communication interface 205 of the imaging apparatus 201 and the second communication interface 302 of the NFC tag module 301 are connected by wire and can transmit and receive data to and from each other. Also, the NFC tag module 301 may be embedded into the imaging apparatus 201.

The imaging module 202 generates an imaging signal by shooting a subject and creates image data by performing various image processing. The image data generated by the imaging module 202 is recorded by a memory card (not illustrated) or the like. The WLAN communication module 203 is a communication module for performing data communication based on a communication standard of IEEE 802.11a/b/g/n or the like. In addition, the WLAN communication module 203 operates as an AP of the WLAN.

The first memory 204 includes a storage medium such as a RAM, a flash memory, or a memory card which is an external storage medium, and various data is read and written according to each purpose of use. For example, the first memory 204 stores format identification data for determining whether data written to the second memory 303 by the NFC communication module 103 has a specific format. In addition, for example, the first memory 204 stores a control program for generally controlling an operation of each unit provided in the imaging apparatus 201. In addition, for example, the first memory 204 stores data or the like exchanged by the WLAN communication module 203. In addition, for example, the first memory 204 stores data or the like written to the second memory 303 by the NFC communication module 103.

The first communication interface 205 is an interface for performing data transmission and reception to and from the second communication interface 302. The control unit 206 generally controls the operation of each unit provided in the imaging apparatus 201. For example, the control unit 206 determines whether data written to the second memory 303 of the NFC tag module 301 by the NFC communication module 103 has a specific format, and controls various types of operations of the imaging apparatus based on a determination result. Also, a display unit or operation unit (not illustrated) or the like is also included as a unit of which the operation is controlled by the control unit 206.

The NFC tag module 301 is a module in which reading/writing of data from the NFC communication module 103 provided in the portable terminal 101 is performed. The second communication interface 302 is an interface for performing data transmission and reception to and from the first communication interface 205. The second memory 303 is a memory in which reading and writing are possible.

The NFC communication module 103 of the portable terminal 101 can perform reading from and writing to the second memory 303 provided in the NFC tag module 301 with only power supply based on a radio frequency (RF) magnetic field generated by the NFC communication module 103. In addition, the control unit 206 of the imaging apparatus 201 can perform reading from and writing to the second memory 303 provided in the NFC tag module 301 via the first communication interface 205 and the second communication interface 302.

The first communication interface 205 and the second communication interface 302 have a function of outputting an activation signal using an RF magnetic field generated by the NFC communication module 103 or NFC data communication (reading from or writing to the second memory 303) as a trigger (detection unit). The control unit 206 includes a central processing unit (CPU), and the CPU operates at minimum power even when power of the imaging apparatus 201 is turned off. This state is referred to as a sleep state. If activation signals output by the first communication interface 205 and the second communication interface 302 have been detected at the time of the sleep state, the CPU of the control unit 206 releases the sleep state and turns on the power of each unit provided in the imaging apparatus 201.

In addition, the first communication interface 205 and the second communication interface 302 have a function of outputting an NFC tag writing complete signal when writing to the second memory 303 by the NFC communication module 103 of the portable terminal 101 has been completed normally.

Figure 3:
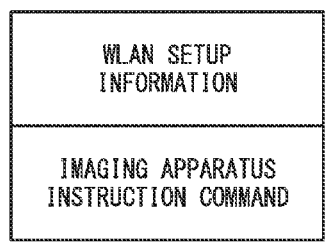
FIG. 3 is a schematic diagram illustrating a memory map of a second memory of the NFC tag module in this embodiment.

Next, data to be written to the second memory 303 of the NFC tag module 301 will be described. FIG. 3 is a schematic diagram illustrating a memory map of the second memory 303 of the NFC tag module 301 in this embodiment. In the illustrated example, WLAN setup information and an imaging apparatus instruction command are written to the second memory 303. For example, the WLAN setup information is written by the control unit 206 via the first communication interface 205 of the imaging apparatus 201 and the second communication interface 302 of the NFC tag module 301. In addition, for example, the imaging apparatus instruction command is written to the second memory 303 of the NFC tag module 301 by the NFC communication module 103 of the portable terminal 101.

In the WLAN setup information, a WLAN identifier (service set identifier (SSID)) and a network key (passphrase) are set as information for establishing a WLAN connection. The WLAN setting information, for example, may be configured to be recorded in an NFC data exchange format (NDEF) format scheme. When the WLAN setup information is recorded in the NDEF format scheme, a media type prescribed in Request for Comments (RFC) 2046 is set in a Type Name Format (TNF) field and a value for identifying the WLAN setup information is set in a Type field. For example, a value set in the Type field is "application/vnd.somecompany.wlan" or the like and an arbitrary value can be set for a part of "somecompany.wlan." In addition, when a value set in the Type field is set as "application/vnd.somecompany.cameraWlan" or when there is "cameraWlan," it is also possible to identify that the WLAN setup information is WLAN setup information "for the imaging apparatus."

An instruction command of an operation for the imaging apparatus 201 from the portable terminal 101 is set in the imaging apparatus instruction command. The imaging apparatus instruction command, for example, may be recorded in the NDEF format scheme. When the imaging apparatus instruction command has been recorded in the NDEF format scheme, the media type prescribed in RFC 2046 is set in the TNF field and a value for identifying the imaging apparatus instruction command is set in the Type field. For example, the value set in the Type field is "application/vnd.somecompany.cameraAction" or the like, and an arbitrary value can be set for a part of somecompany.cameraAction.

As the imaging apparatus instruction command, there is a "WLAN AP activation command" for activating the AP of the WLAN, a "remote shooting mode activation command" for enabling a remote shooting function from the portable terminal 101, an "image browsing mode activation command" for browsing image data recorded on the imaging apparatus 201 from the portable terminal 101, a "shooting parameter change command" for changing a value of a shooting parameter of the imaging module 202, or the like. The "remote shooting mode activation command" and the "image browsing mode activation command" can also serve as an activation instruction of the AP of the WLAN.

Figure 4:
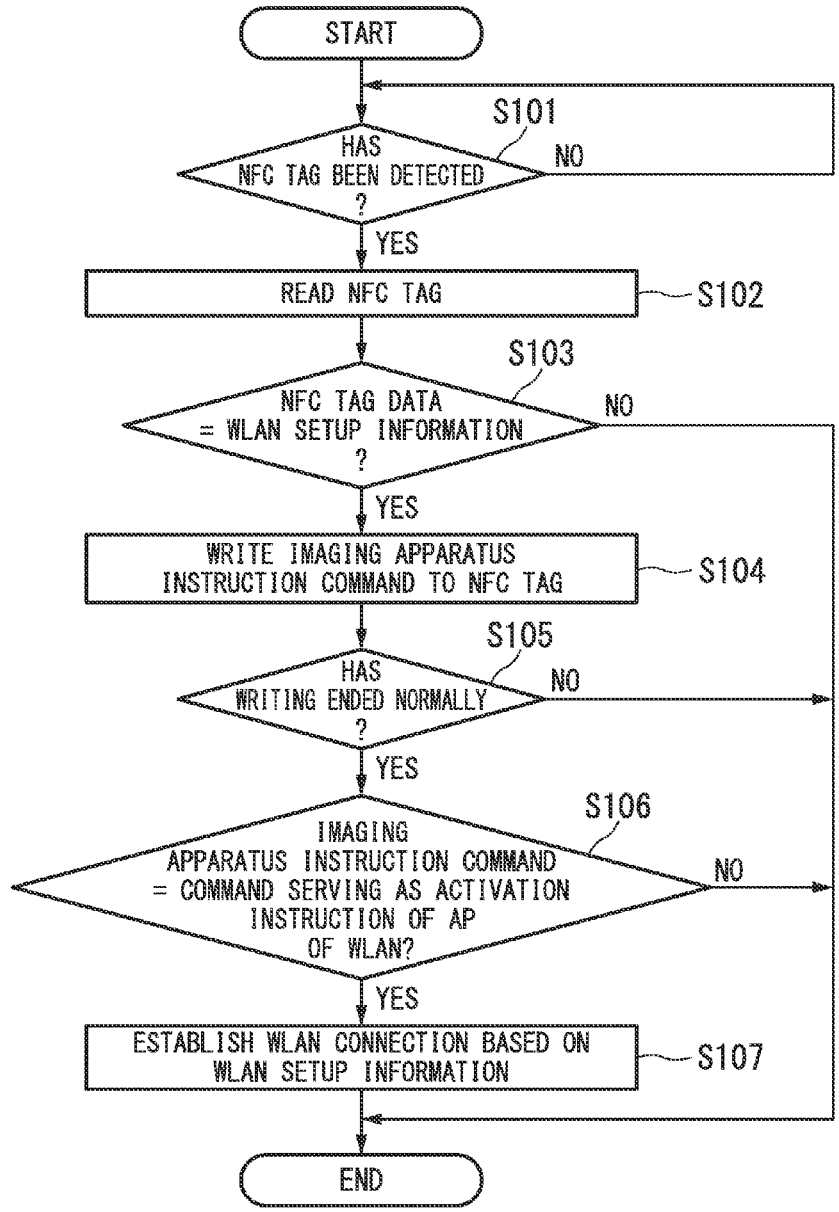
FIG. 4 is a flowchart illustrating an operation procedure of the portable terminal in this embodiment.

Next, an operation procedure of the portable terminal 101 will be described. FIG. 4 is a flowchart illustrating the operation procedure of the portable terminal 101 in this embodiment.

(Step S101) The control unit 105 determines whether the NFC communication module 103 has detected the NFC tag module 301. The operation procedure proceeds to the process of step S102 when the NFC tag module 301 has been detected, and the process of step S101 is executed again when the NFC tag module 301 has not been detected.

(Step S102) The NFC communication module 103 reads data recorded on the second memory 303 of the NFC tag module 301. Thereafter, the operation procedure proceeds to the process of step S103.

(Step S103) The control unit 105 determines whether data read by the NFC communication module 103 from the second memory 303 in the process of step S102 is WLAN setup information. When the data read from the second memory 303 is the WLAN setup information, the operation procedure proceeds to the process of step S104 and the process ends when the data read from the second memory 303 is not the WLAN setup information.

(Step S104) The control unit 105 writes the imaging apparatus instruction command to the second memory 303 of the NFC tag module 301 via the NFC communication module 103. Thereafter, the operation procedure proceeds to the process of step S105.

(Step S105) The control unit 105 determines whether writing of the imaging apparatus instruction command executed in the process of step S104 has ended normally. The operation procedure proceeds to the process of step S106 when the writing of the imaging apparatus instruction command has ended normally and the process ends when the writing of the imaging apparatus instruction command has not ended normally.

(Step S106) The control unit 105 determines whether the imaging apparatus instruction command written in the process of step S104 is a command serving as an activation instruction of the AP of the WLAN. The operation procedure proceeds to the process of step S107 when the imaging apparatus instruction command is the command serving as the activation instruction of the AP of the WLAN, and the process ends when the imaging apparatus instruction command is a command which does not serve as the activation instruction of the AP of the WLAN.

(Step S107) The control unit 105 causes the WLAN communication module 102 to establish a WLAN connection to the imaging apparatus 201 based on WLAN setup information read in the process of step S102. Thereafter, the process ends.

Through the above-described process, the portable terminal 101 is connected to the imaging apparatus 201 through the WLAN connection only when the data read from the second memory 303 of the NFC tag module 301 is WLAN setup information and writing of the imaging apparatus instruction command to the second memory 303 of the NFC tag module 301 has been completed normally and when the imaging apparatus instruction command serves as the AP activation instruction of the WLAN. Thereby, the portable terminal 101 can be configured so that the WLAN connection to the imaging apparatus 201 is not ineffectually established.

Also, although the control unit 105 determines whether the data read by the NFC communication module 103 in the process of step S102 is WLAN setup information in the process of step S103, the present invention is not limited thereto. For example, the operation procedure proceeds to the process of step S104 when the data read from the second memory 303 is "WLAN setup information of the imaging apparatus 201" in the process of step S103, and the process may be configured to end when the data read from the second memory 303 is not the "WLAN setup information of the imaging apparatus 201." In this case, the portable terminal 101 is connected to the imaging apparatus 201 through the WLAN connection only when the data read from the second memory 303 of the NFC tag module 301 is the "WLAN setup information of the imaging apparatus 201" and writing of the imaging apparatus instruction command to the second memory 303 of the NFC tag module 301 has been completed normally and when the imaging apparatus instruction command serves as the AP activation instruction of the WLAN. Thereby, the portable terminal 101 can be further configured so that the WLAN is not ineffectually connected to the imaging apparatus 201.

Figure 5:
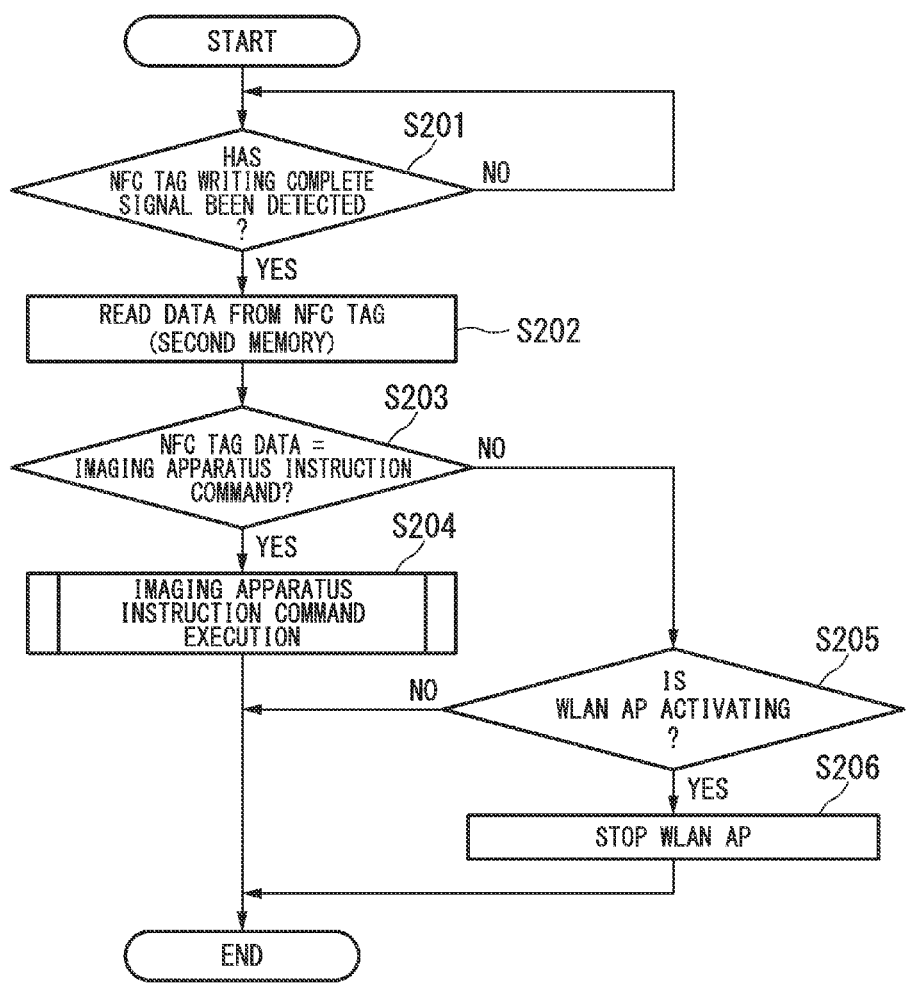
FIG. 5 is a flowchart illustrating an operation procedure of the imaging apparatus when power of the imaging apparatus is in an ON state in this embodiment.

Next, the operation procedure of the imaging apparatus 201 will be described. Hereinafter, an operation procedure when power of the imaging apparatus 201 is in an ON state and an operation procedure when the power of the imaging apparatus 201 is in an OFF state will be described. FIG. 5 is a flowchart illustrating the operation procedure of the imaging apparatus 201 when the power of the imaging apparatus 201 is in the ON state in this embodiment.

(Step S201) The control unit 206 determines whether it is detected that the first communication interface 205 and the second communication interface 302 have output an NFC tag writing complete signal indicating that writing to the second memory 303 has been completed normally. The operation procedure proceeds to the process of step S202 when the output of the NFC tag writing complete signal has been detected, and the process of step S201 is executed again when the output of the NFC tag writing complete signal has not been detected.

(Step S202) The control unit 206 reads data stored in the second memory 303 via the first communication interface 205 and the second communication interface 302.

Thereafter, the operation procedure proceeds to the process of step S203.

(Step S203) The control unit 206 determines whether the data read from the second memory 303 in the process of step S202 is an imaging apparatus instruction command. The operation procedure proceeds to the process of step S204 when the data read from the second memory 303 is the imaging apparatus instruction command, and proceeds to the process of step S205 when the data read from the second memory 303 is not the imaging apparatus instruction command.

(Step S204) The control unit 206 executes the imaging apparatus instruction command read in the process of step S202. Thereafter, the process ends.

(Step S205) The control unit 206 determines whether the WLAN communication module 203 is activated as the AP of the WLAN. The operation procedure proceeds to the process of step S206 when it is determined that the WLAN communication module 203 is activated as the AP of the WLAN and the process ends when it is determined that the WLAN communication module 203 is not activated as the AP of the WLAN.

(Step S206) The control unit 206 controls the WLAN communication module 203, and stops a function as the AP of the WLAN. Thereafter, the process ends.

Through the above-described process, the imaging apparatus 201 stops the function as the WLAN AP of the WLAN communication module 203 when the data read from the second memory 303 of the NFC tag module 301 is not the imaging apparatus instruction command. Thereby, the imaging apparatus 201 can be configured so that the WLAN communication module 203 does not ineffectually operate and can reduce power consumption.

Figure 6:
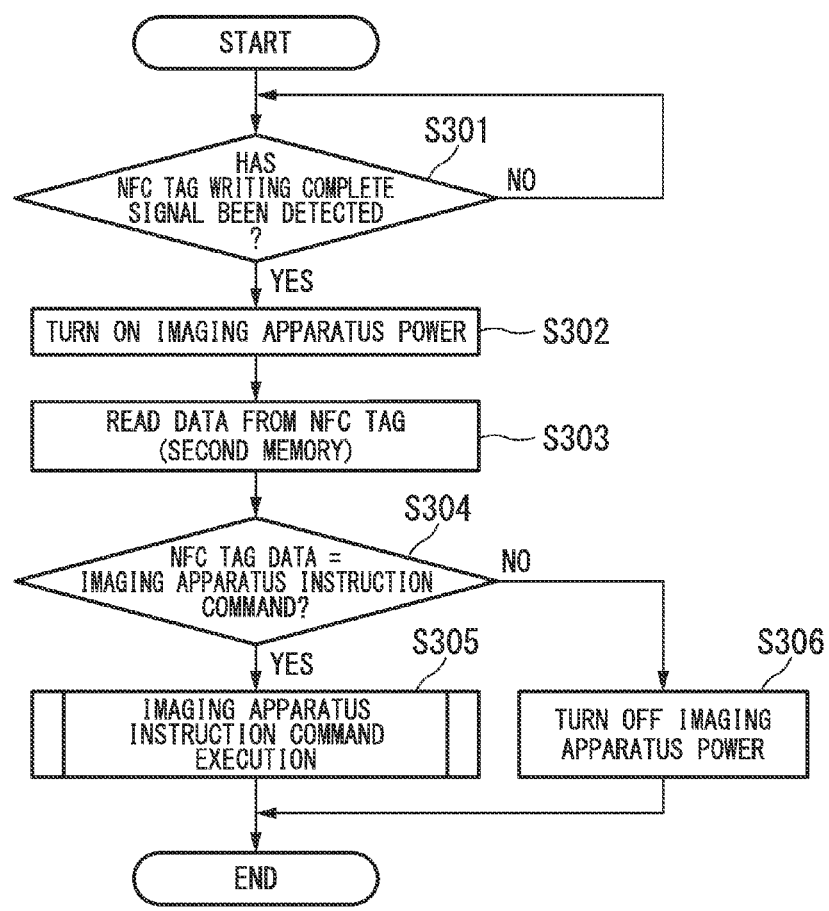
FIG. 6 is a flowchart illustrating an operation procedure of the imaging apparatus when the power of the imaging apparatus is in an OFF state in this embodiment.

FIG. 6 is a flowchart illustrating the operation procedure of the imaging apparatus 201 when the power of the imaging apparatus 201 is in the OFF state in this embodiment.

(Step S301) The control unit 206 determines whether it is detected that the first communication interface 205 and the second communication interface 302 have output an NFC tag writing complete signal, as activation signal, which indicates that writing to the second memory 303 has been completed normally. The operation procedure proceeds to the process of step S302 when the output of the NFC tag writing complete signal has been detected, and the process of step S301 is executed again when the output of the NFC tag writing complete signal has not been detected.

(Step S302) Because the activation signals output by the first communication interface 205 and the second communication interface 302 have been detected at the time of the sleep state, the control unit 206 (CPU) releases the sleep state and turns on the power of each unit of the imaging apparatus 201. Thereafter, the operation procedure proceeds to the process of step S303.

(Step S303) The control unit 206 reads data stored in the second memory 303 via the first communication interface 205 and the second communication interface 302.

Thereafter, the operation procedure proceeds to the process of step S304.

(Step S304) The control unit 206 determines whether the data read from the second memory 303 in the process of step S303 is an imaging apparatus instruction command. The operation procedure proceeds to the process of step S305 when the data read from the second memory 303 is the imaging apparatus instruction command, and proceeds to the process of step S306 when the data read from the second memory 303 is not the imaging apparatus instruction command.

(Step S305) The control unit 206 executes the imaging apparatus instruction command read in the process of step S303. Thereafter, the process ends.

(Step S306) The control unit 206 turns off the power of the imaging apparatus 201 (sleep state). Thereafter, the process ends.

Through the above-described process, the imaging apparatus 201 turns off the power of the imaging apparatus 201 itself when the data read from the second memory 303 of the NFC tag module 301 is not the imaging apparatus instruction command. Thereby, the imaging apparatus 201 can be configured so that the WLAN communication module 203 does not ineffectually operate and can reduce power consumption.

Figure 7:
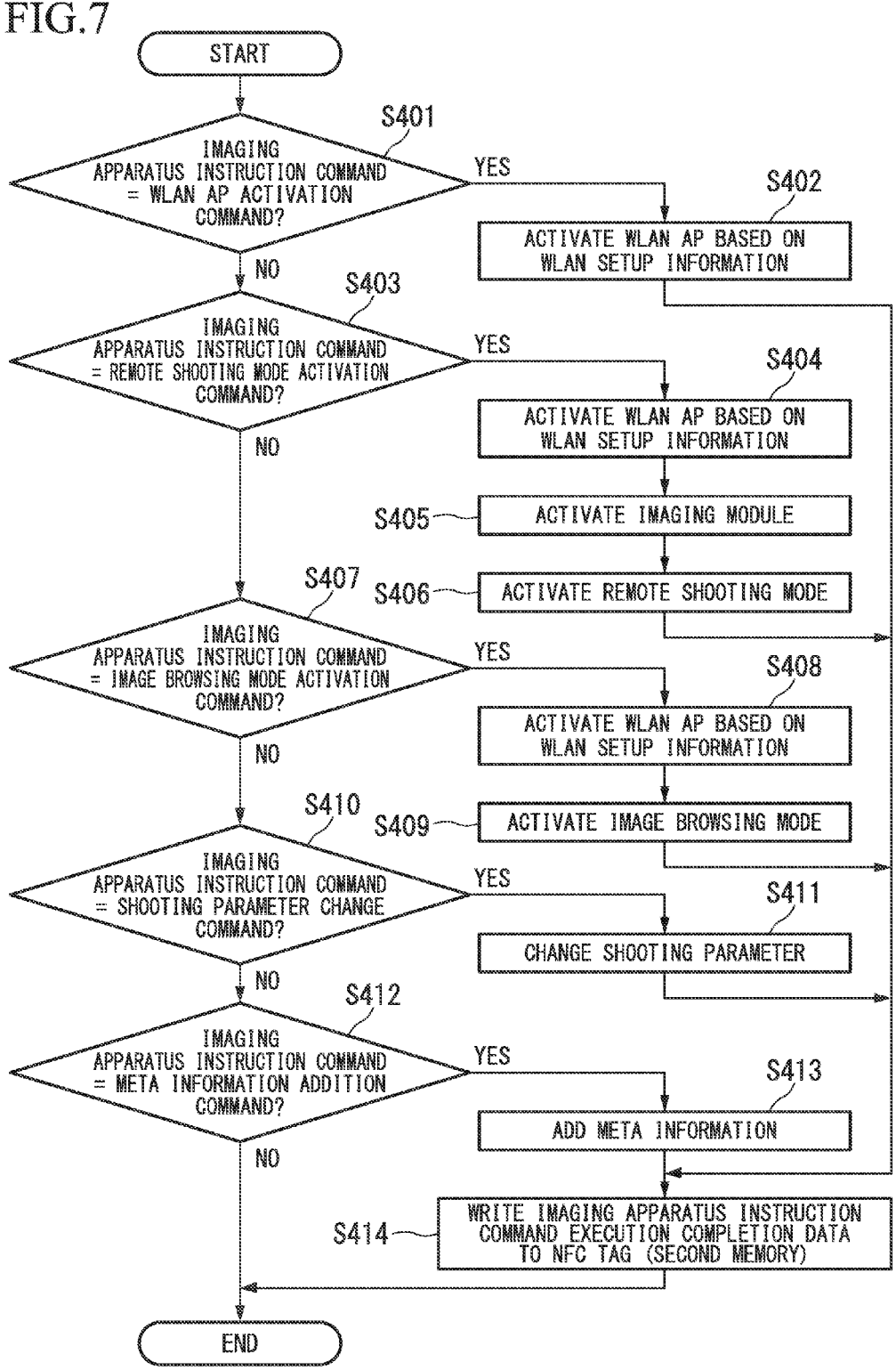
FIG. 7 is a flowchart illustrating a procedure in which a control unit executes an imaging apparatus instruction command.

Next, a procedure (processes of steps S204 and S305) in which the control unit 206 executes the imaging apparatus instruction command will be described. FIG. 7 is a flowchart illustrating a procedure in which the control unit 206 executes the imaging apparatus instruction command in this embodiment.

(Step S401) The control unit 206 determines whether the imaging apparatus instruction command read from the second memory 303 is the "WLAN AP activation command." The operation procedure proceeds to the process of step S402 when the control unit 206 determines that the imaging apparatus instruction command is the "WLAN AP activation command," and proceeds to the process of step S403 when the control unit 206 determines that the imaging apparatus instruction command is not the "WLAN AP activation command."

(Step S402) The control unit 206 controls the WLAN communication module 203 to activate a function as the AP of the WLAN based on the WLAN setup information written to the second memory 303. Thereafter, the operation procedure proceeds to the process of step S414.

(Step S403) The control unit 206 determines whether the imaging apparatus instruction command read from the second memory 303 is the "remote shooting mode activation command." The operation procedure proceeds to the process of step S404 when the control unit 206 determines that the imaging apparatus instruction command is the "remote shooting mode activation command," and proceeds to the process of step S407 when the control unit 206 determines that the imaging apparatus instruction command is not the "remote shooting mode activation command."

(Step S404) The control unit 206 controls the WLAN communication module 203 to activate a function as the AP of the WLAN based on the WLAN setup information written to the second memory 303. Thereafter, the operation procedure proceeds to the process of step S405.

(Step S405) The control unit 206 activates the imaging module 202. Thereafter, the operation procedure proceeds to the process of step S406.

(Step S406) The control unit 206 activates a remote shooting mode. Thereafter, the operation procedure proceeds to the process of step S414.

(Step S407) The control unit 206 determines whether the imaging apparatus instruction command read from the second memory 303 is the "image browsing mode activation command." The operation procedure proceeds to the process of step S408 when the control unit 206 determines that the imaging apparatus instruction command is the "image browsing mode activation command," and proceeds to the process of step S410 when the control unit 206 determines that the imaging apparatus instruction command is not the "image browsing mode activation command."

(Step S408) The control unit 206 controls the WLAN communication module 203 to activate a function as the AP of the WLAN based on the WLAN setup information written to the second memory 303. Thereafter, the operation procedure proceeds to the process of step S409.

(Step S409) The control unit 206 activates an image browsing mode. Thereafter, the operation procedure proceeds to the process of step S414.

(Step S410) The control unit 206 determines whether the imaging apparatus instruction command read from the second memory 303 is the "shooting parameter change command." The operation procedure proceeds to the process of step S411 when the control unit 206 determines that the imaging apparatus instruction command is the "shooting parameter change command," and proceeds to the process of step S412 when the control unit 206 determines that the imaging apparatus instruction command is not the "shooting parameter change command."

(Step S411) The control unit 206 changes a shooting parameter. Thereafter, the operation procedure proceeds to the process of step S414.

(Step S412) The control unit 206 determines whether the imaging apparatus instruction command read from the second memory 303 is a "meta information addition command." The operation procedure proceeds to the process of step S413 when the control unit 206 determines that the imaging apparatus instruction command is the "meta information addition command," and the process ends when the control unit 206 determines that the imaging apparatus instruction command is not the "meta information addition command."

(Step S413) The control unit 206 adds meta information. Thereafter, the operation procedure proceeds to the process of step S414.

(Step S414) The control unit 206 writes imaging apparatus instruction command execution completion data to the second memory 303 via the first communication interface 205 and the second communication interface 302. Thereafter, the process ends.

Figure 8:
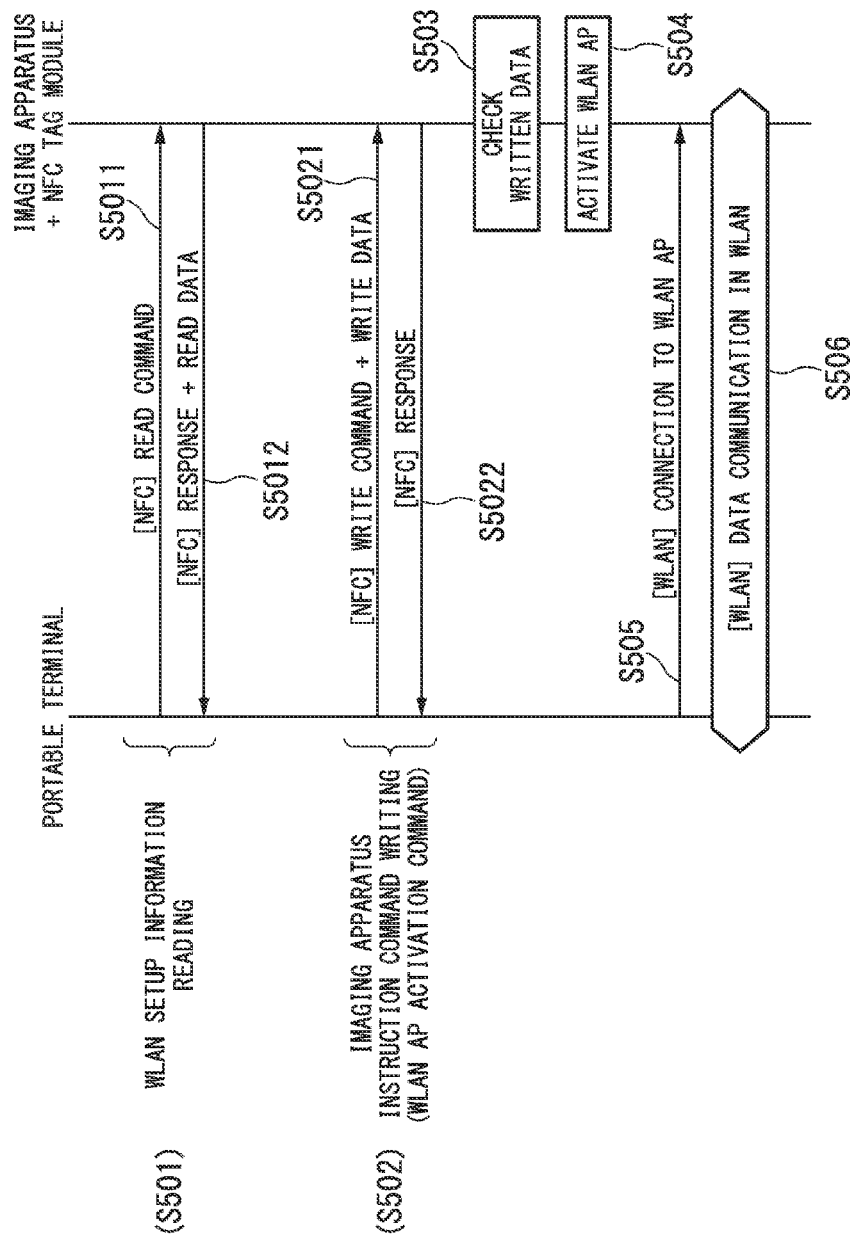
FIG. 8 is a sequence diagram illustrating operations of the portable terminal, the imaging apparatus, and an NFC tag module when the power of the imaging apparatus is in an ON state and an imaging apparatus instruction command is a "WLAN AP activation command" in this embodiment.

Next, a specific example of operations of the portable terminal 101, the imaging apparatus 201, and the NFC tag module 301 will be described. FIG. 8 is a sequence diagram illustrating the operations of the portable terminal 101, the imaging apparatus 201, and the NFC tag module 301 when the power of the imaging apparatus 201 is in the ON state and the imaging apparatus instruction command is a "WLAN AP activation command."

(Step S501) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S5011). Subsequently, the imaging apparatus 201 and the NFC tag module 301 transmit a response and data (WLAN setup information) to the portable terminal 101 using the NFC (step S5012).

(Step S502) The portable terminal 101 writes the imaging apparatus instruction command, that is, the "WLAN AP activation command," to the imaging apparatus 201 and the NFC tag module 301 using the NFC. Specifically, the portable terminal 101 transmits a write command and write data (WLAN AP activation command) to the imaging apparatus 201 and the NFC tag module 301 using the NFC (step S5021). Subsequently, the imaging apparatus 201 and the NFC tag module 301 transmit a response to the portable terminal 101 using the NFC (step S5022).

(Step S503) The imaging apparatus 201 and the NFC tag module 301 check written data because the data has been written in the process of step S502.

(Step S504) The imaging apparatus 201 and the NFC tag module 301 activate an AP function of the WLAN communication module 203 based on data (WLAN AP activation command) checked in the process of step S503.

(Step S505) The portable terminal 101 is connected to the AP of the WLAN communication module 203 based on the WLAN setup information read in the process of step S012 using the WLAN.

(Step S506) The portable terminal 101 performs data transmission and reception to and from the imaging apparatus 201 and the NFC tag module 301 using the WLAN.

In this manner, when the WLAN is necessary (for example, when the imaging apparatus instruction command, that is, the "WLAN AP activation command," has been written to the second memory 303 of the NFC tag module 301), the imaging apparatus 201 can operate the WLAN communication module 203.

Figure 9:
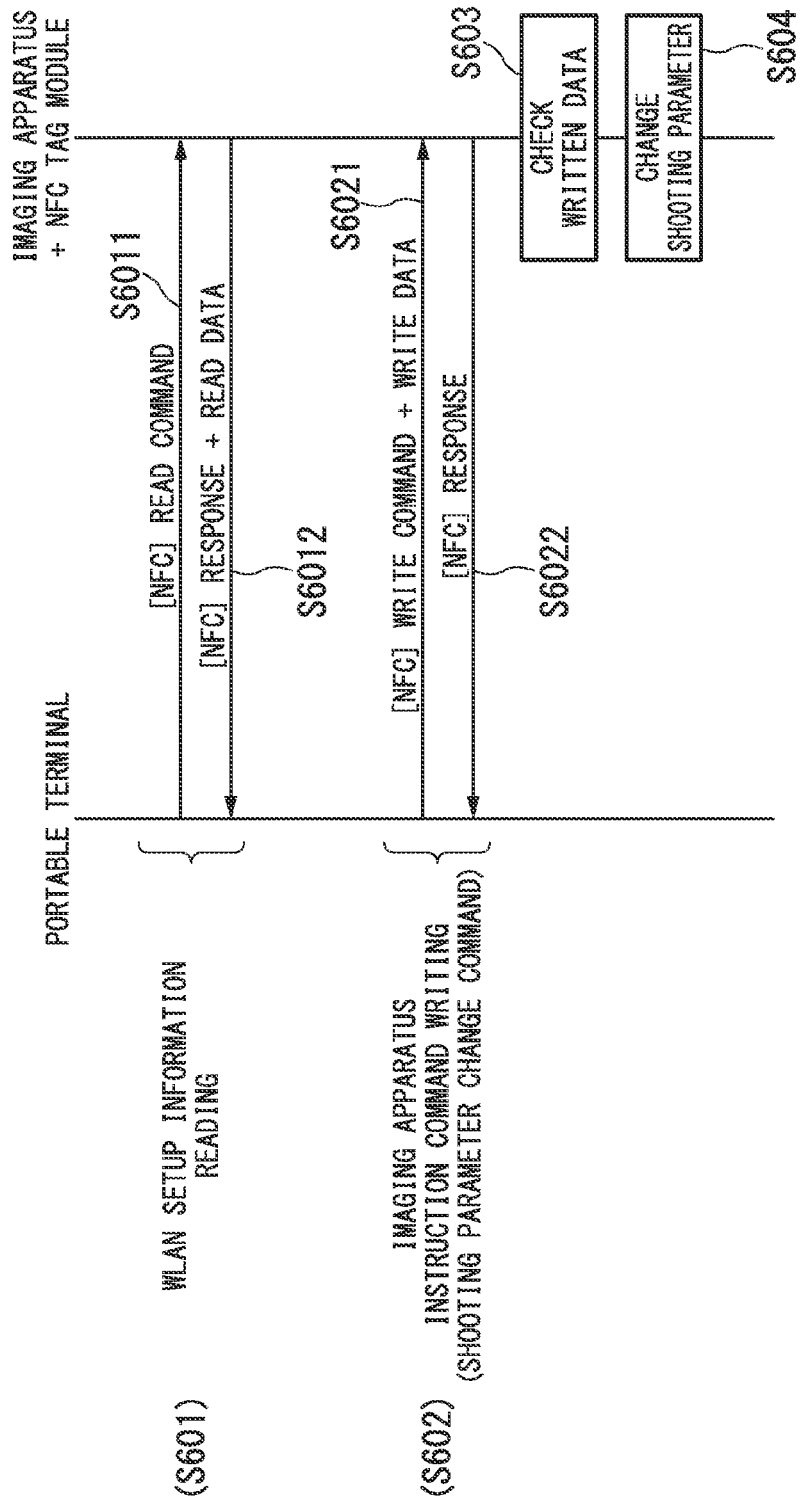
FIG. 9 is a sequence diagram illustrating operations of the portable terminal, the imaging apparatus, and the NFC tag module when the power of the imaging apparatus is in the ON state and the imaging apparatus instruction command does not include the WLAN AP activation instruction such as a "shooting parameter change command" in this embodiment.

FIG. 9 is a sequence diagram illustrating operations of the portable terminal 101, the imaging apparatus 201, and the NFC tag module 301 when the power of the imaging apparatus 201 is in an ON state and the imaging apparatus instruction command does not include the WLAN AP activation instruction such as a "shooting parameter change command" in this embodiment.

(Step S601) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S6011). Subsequently, the imaging apparatus 201 and the NFC tag module 301 transmit a response and data (WLAN setup information) to the portable terminal 101 using the NFC (step S6012).

(Step S602) The portable terminal 101 writes the imaging apparatus instruction command, that is, a "shooting parameter change command," to the imaging apparatus 201 and the NFC tag module 301 using the NFC. Specifically, the portable terminal 101 transmits a write command and write data (shooting parameter change command) to the imaging apparatus 201 and the NFC tag module 301 using the NFC (step S6021). Subsequently, the imaging apparatus 201 and the NFC tag module 301 transmit a response to the portable terminal 101 using the NFC (step S6022).

(Step S603) The imaging apparatus 201 and the NFC tag module 301 check written data because the data has been written in the process of step S602.

(Step S604) The imaging apparatus 201 and the NFC tag module 301 change a shooting parameter based on data (shooting parameter change command) checked in the process of step S603.

In this manner, because the imaging apparatus 201 does not ineffectually operate the WLAN communication module 203 when the WLAN is unnecessary (for example, when an imaging apparatus instruction command in which the WLAN does not need to be used has been written to the second memory 303 of the NFC tag module 301), it is possible to reduce power consumption.

Figure 10:
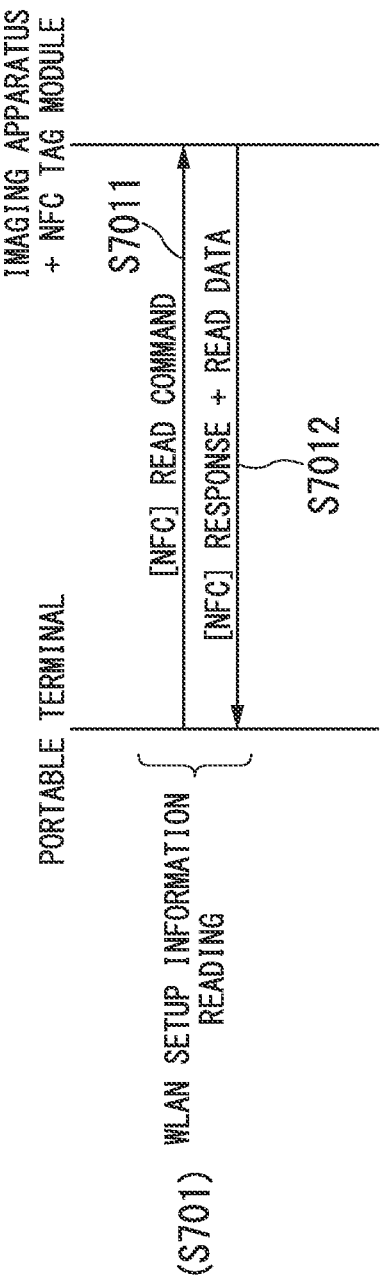
FIG. 10 is a sequence diagram illustrating operations of the portable terminal, the imaging apparatus, and the NFC tag module when the power of the imaging apparatus is in the ON state and there is no writing of the imaging apparatus instruction command in this embodiment.

FIG. 10 is a sequence diagram illustrating operations of the portable terminal 101, the imaging apparatus 201, and the NFC tag module 301 when the power of the imaging apparatus 201 is in the ON state and there is no writing of the imaging apparatus instruction command.

(Step S701) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S7011). Subsequently, the imaging apparatus 201 and the NFC tag module 301 transmit a response and data (WLAN setup information) to the portable terminal 101 using the NFC (step S7012). Also, because no data is written, the imaging apparatus 201 and the NFC tag module 301 do not separately perform the process after the response command and the data are transmitted.

In this manner, because the imaging apparatus 201 does not ineffectually operate the WLAN communication module 203 when the WLAN is unnecessary (for example, when the imaging apparatus instruction command is not written to the second memory 303 of the NFC tag module 301), it is possible to reduce power consumption.

Figure 11:
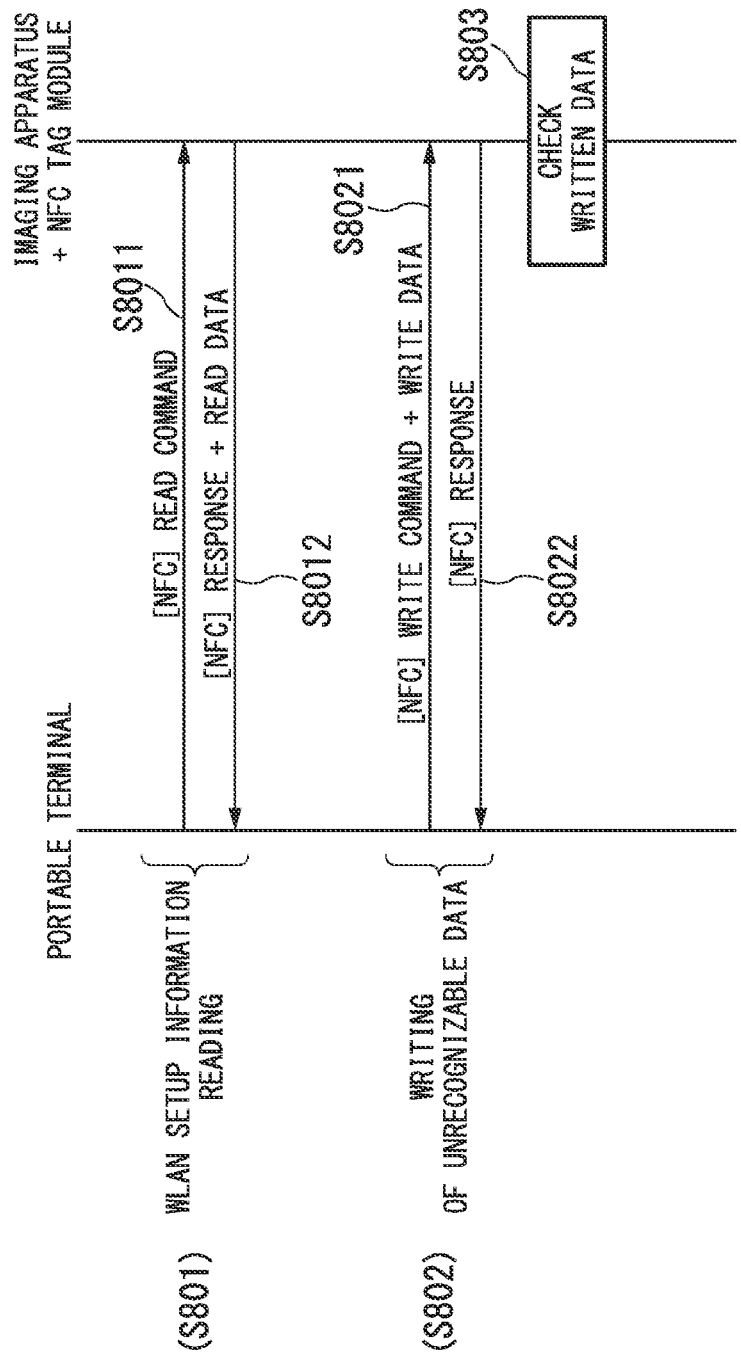
FIG. 11 is a sequence diagram illustrating operations of the portable terminal, the imaging apparatus, and the NFC tag module when the power of the imaging apparatus is in the ON state and the imaging apparatus instruction command is an unrecognizable command in this embodiment.

FIG. 11 is a sequence diagram illustrating operations of the portable terminal 101, the imaging apparatus 201, and the NFC tag module 301 when the power of the imaging apparatus 201 is in the ON state and the imaging apparatus instruction command is an unrecognizable command.

(Step S801) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S8011). Subsequently, the imaging apparatus 201 and the NFC tag module 301 transmit a response and data (WLAN setup information) to the portable terminal 101 using the NFC (step S8012).

(Step S802) The portable terminal 101 writes an unrecognizable imaging apparatus instruction command to the imaging apparatus 201 and the NFC tag module 301 using the NFC. Specifically, the portable terminal 101 transmits a write command and write data (unrecognizable imaging apparatus instruction command) to the imaging apparatus 201 and the NFC tag module 301 using the NFC (step S8021). Subsequently, the imaging apparatus 201 and the NFC tag module 301 transmit a response to the portable terminal 101 using the NFC (step S8022).

(Step S803) The imaging apparatus 201 and the NFC tag module 301 check written data because the data has been written in the process of step S802. Also, because the checked data is the unrecognizable imaging apparatus instruction command, the imaging apparatus 201 and the NFC tag module 301 do not separately perform the process after the written data is checked.

In this manner, because the imaging apparatus 201 does not ineffectually operate the WLAN communication module 203 when the WLAN is unnecessary (for example, when data written to the second memory 303 of the NFC tag module 301 is the unrecognizable imaging apparatus instruction command), it is possible to reduce power consumption.

Figure 12:
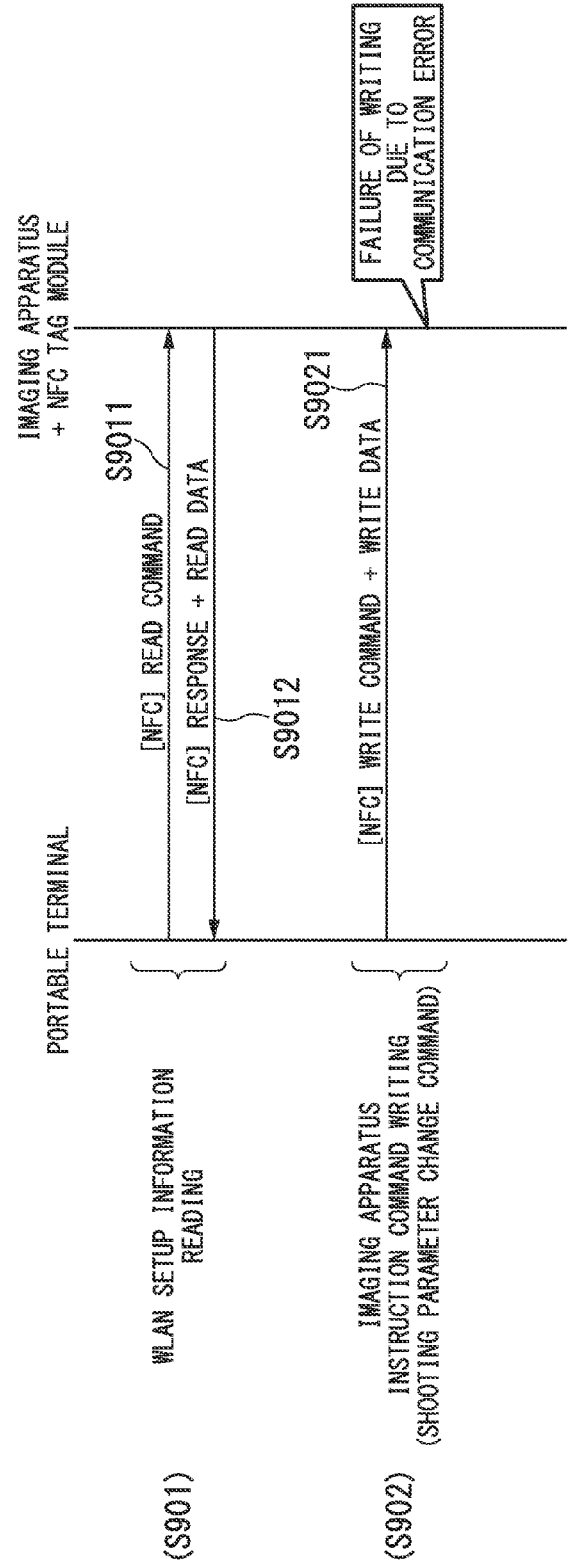
FIG. 12 is a sequence diagram illustrating operations of the portable terminal, the imaging apparatus, and the NFC tag module when the power of the imaging apparatus is in the ON state and writing of the imaging apparatus instruction command, that is, a "WLAN AP activation command," fails in this embodiment.

FIG. 12 is a sequence diagram illustrating operations of the portable terminal 101, the imaging apparatus 201, and the NFC tag module 301 when the power of the imaging apparatus 201 is in the ON state and writing of the imaging apparatus instruction command, that is, a "WLAN AP activation command," fails.

(Step S901) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S9011). Subsequently, the imaging apparatus 201 and the NFC tag module 301 transmit a response and data (WLAN setup information) to the portable terminal 101 using the NFC (step S9012).

(Step S902) Although the portable terminal 101 writes an imaging apparatus instruction command, that is, a "WLAN AP activation command," to the imaging apparatus 201 and the NFC tag module 301, the writing fails. Specifically, the portable terminal 101 transmits a write command and write data (WLAN AP activation command) to the imaging apparatus 201 and the NFC tag module 301 using the NFC (step S9021). However, because the writing of the WLAN AP activation command has failed, the imaging apparatus 201 and the NFC tag module 301 do not separately perform the process.

In this manner, because the imaging apparatus 201 does not ineffectually operate the WLAN communication module 203 when the WLAN is unnecessary (for example, when writing by the portable terminal 101 to the second memory 303 of the NFC tag module 301 has failed), it is possible to reduce power consumption.

Figure 13:
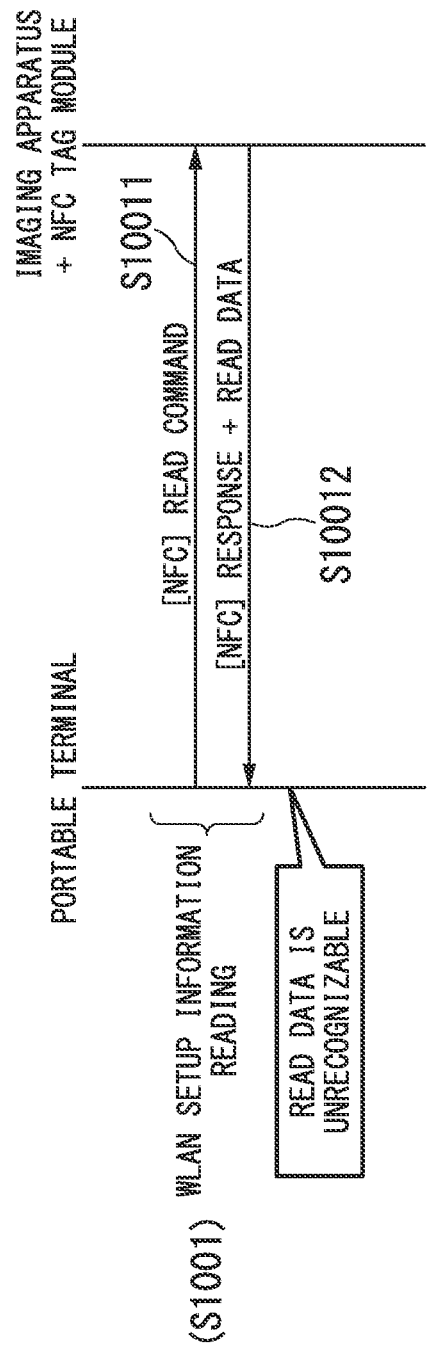
FIG. 13 is a sequence diagram illustrating operations of the portable terminal, the imaging apparatus, and the NFC tag module when the power of the imaging apparatus is in the ON state and it is difficult to recognize data read from the imaging apparatus and the NFC tag module in the portable terminal in this embodiment.

FIG. 13 is a sequence diagram illustrating operations of the portable terminal 101, the imaging apparatus 201, and the NFC tag module 301 when the power of the imaging apparatus 201 is in the ON state and it is difficult to recognize data read from the imaging apparatus 201 and the NFC tag module 301 in the portable terminal 101.

(Step S1001) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S10011). Subsequently, the imaging apparatus 201 and the NFC tag module 301 transmit a response and data (WLAN setup information) to the portable terminal 101 using the NFC (step S10012). However, because it is difficult to recognize data read from the imaging apparatus 201 and the NFC tag module 301, the portable terminal 101 does not separately perform the process. In addition, because the portable terminal 101 performs no process, the imaging apparatus 201 also performs no process.

In this manner, because the imaging apparatus 201 does not ineffectually operate the WLAN communication module 203 when the WLAN is unnecessary (for example, when it is difficult for the portable terminal 101 to recognize data read from the second memory 303 of the NFC tag module 301), it is possible to reduce power consumption.

Figure 14:
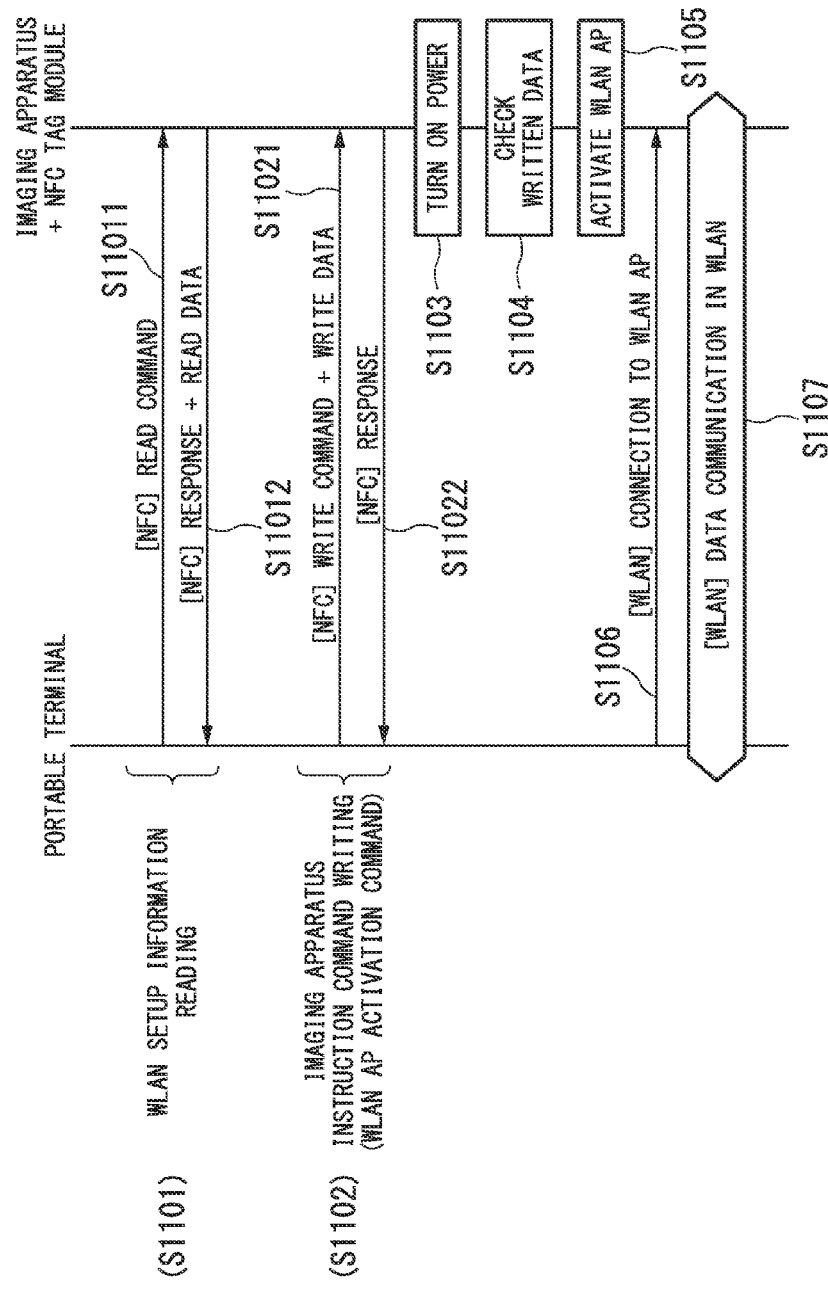
FIG. 14 is a sequence diagram illustrating operations of the portable terminal, the imaging apparatus, and the NFC tag module when the power of the imaging apparatus is in the OFF state and the imaging apparatus instruction command is the "WLAN AP activation command" in this embodiment.

FIG. 14 is a sequence diagram illustrating operations of the portable terminal 101, the imaging apparatus 201, and the NFC tag module 301 when the power of the imaging apparatus 201 is in an OFF state and the imaging apparatus instruction command is the "WLAN AP activation command."

(Step S1101) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S11011). Subsequently, the imaging apparatus 201 and the NFC tag module 301 transmit a response and data (WLAN setup information) to the portable terminal 101 using the NFC (step S11012).

(Step S1102) The portable terminal 101 writes the imaging apparatus instruction command, that is, a "WLAN AP activation command," to the imaging apparatus 201 and the NFC tag module 301 using the NFC. Specifically, the portable terminal 101 transmits a write command and write data (WLAN AP activation command) to the imaging apparatus 201 and the NFC tag module 301 using the NFC (step S11021). Subsequently, the imaging apparatus 201 and the NFC tag module 301 transmit a response to the portable terminal 101 using the NFC (step S11022).

(Step S1103) The imaging apparatus 201 and the NFC tag module 301 turn on the power of the imaging apparatus 201 because the imaging apparatus 201 detects that the data has been written in the process of step S1102.

(Step S1104) The imaging apparatus 201 and the NFC tag module 301 check written data because the data has been written in the process of step S1102.

(Step S1105) The imaging apparatus 201 and the NFC tag module 301 activate an AP function of the WLAN communication module 203 based on data (WLAN AP activation command) checked in the process of step S1104.

(Step S1106) The portable terminal 101 is connected to the AP of the WLAN communication module 203 using the WLAN.

(Step S1107) The portable terminal 101 performs data transmission and reception to and from the imaging apparatus 201 and the NFC tag module 301 using the WLAN.

In this manner, when the process is necessary (for example, when the imaging apparatus instruction command has been written to the second memory 303 of the NFC tag module 301), the imaging apparatus 201 can turn on the power of the imaging apparatus 201. In addition, when the WLAN is necessary (for example, when the imaging apparatus instruction command, that is, the "WLAN AP activation command," has been written to the second memory 303 of the NFC tag module 301), the imaging apparatus 201 can operate the WLAN communication module 203.

Figure 15:
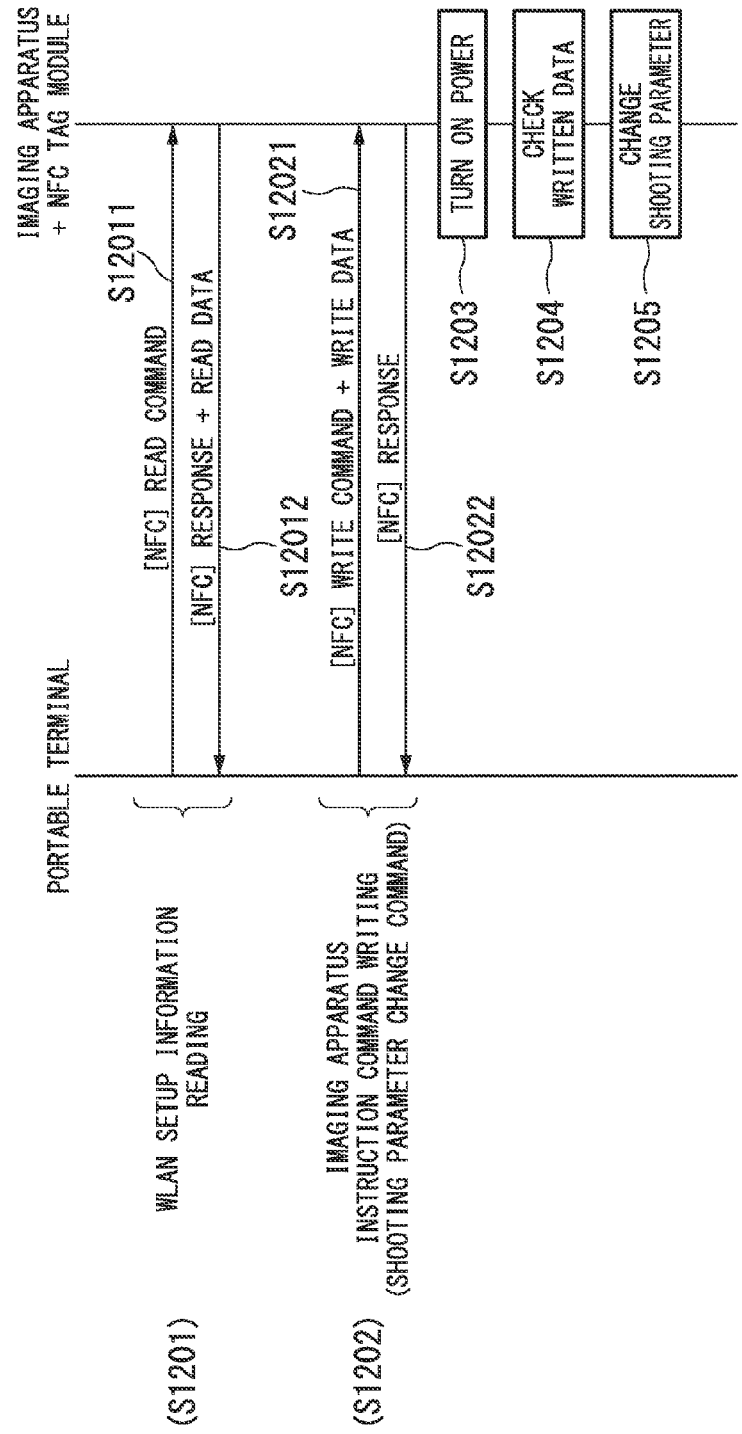
FIG. 15 is a sequence diagram illustrating operations of the portable terminal, the imaging apparatus, and the NFC tag module when the power of the imaging apparatus is in the OFF state and the imaging apparatus instruction command does not include the WLAN AP activation instruction such as the "shooting parameter change command" in this embodiment.

FIG. 15 is a sequence diagram illustrating operations of the portable terminal 101, the imaging apparatus 201, and the NFC tag module 301 when the power of the imaging apparatus 201 is in the OFF state and the imaging apparatus instruction command does not include the WLAN AP activation instruction such as the "shooting parameter change command."

(Step S1201) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S12011). Subsequently, the imaging apparatus 201 and the NFC tag module 301 transmit a response and data (WLAN setup information) to the portable terminal 101 using the NFC (step S12012).

(Step S1202) The portable terminal 101 writes the imaging apparatus instruction command, that is, a "shooting parameter change command," to the imaging apparatus 201 and the NFC tag module 301 using the NFC. Specifically, the portable terminal 101 transmits a write command and write data (shooting parameter change command) to the imaging apparatus 201 and the NFC tag module 301 using the NFC (step S12021). Subsequently, the imaging apparatus 201 and the NFC tag module 301 transmit a response to the portable terminal 101 using the NFC (step S12022).

(Step S1203) The imaging apparatus 201 and the NFC tag module 301 turn on the power of the imaging apparatus 201 because the imaging apparatus 201 detects that the data has been written in the process of step S1202.

(Step S1204) The imaging apparatus 201 and the NFC tag module 301 check written data because the data has been written in the process of step S1202.

(Step S1205) The imaging apparatus 201 and the NFC tag module 301 change a shooting parameter based on data (shooting parameter change command) checked in the process of step S1204.

In this manner, when the process is necessary (for example, when the imaging apparatus instruction command has been written to the second memory 303 of the NFC tag module 301), the imaging apparatus 201 can turn on the power of the imaging apparatus 201. In addition, because the imaging apparatus 201 does not ineffectually operate the WLAN communication module 203 when the WLAN is unnecessary (for example, when the imaging apparatus instruction command in which it is unnecessary to use the WLAN has been written to the second memory 303 of the NFC tag module 301), it is possible to reduce power consumption.

Figure 16:
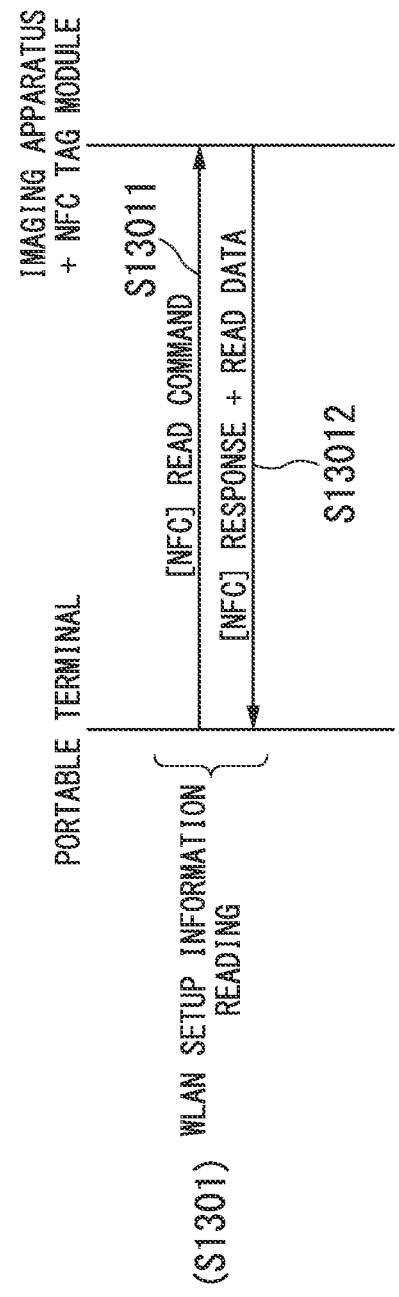
FIG. 16 is a sequence diagram illustrating operations of the portable terminal, the imaging apparatus, and the NFC tag module when the power of the imaging apparatus is in the OFF state and there is no writing of the imaging apparatus instruction command in this embodiment.

FIG. 16 is a sequence diagram illustrating operations of the portable terminal 101, the imaging apparatus 201, and the NFC tag module 301 when the power of the imaging apparatus 201 is in the OFF state and there is no writing of the imaging apparatus instruction command.

(Step S1301) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S13011). Subsequently, the imaging apparatus 201 and the NFC tag module 301 transmit a response and data (WLAN setup information) to the portable terminal 101 using the NFC (step S13012). Also, because no data is written to the second memory 303 of the NFC tag module 301, the imaging apparatus 201 does not separately perform the process after the response command and the data are transmitted.

In this manner, when no process is performed (for example, when no data is written to the second memory 303 of the NFC tag module 301), the imaging apparatus 201 may not turn on the power of the imaging apparatus 201. In addition, because the imaging apparatus 201 does not ineffectually operate the WLAN communication module 203 when the WLAN is unnecessary (for example, when no imaging apparatus instruction command is written to the second memory 303 of the NFC tag module 301), it is possible to reduce power consumption.

Figure 17:
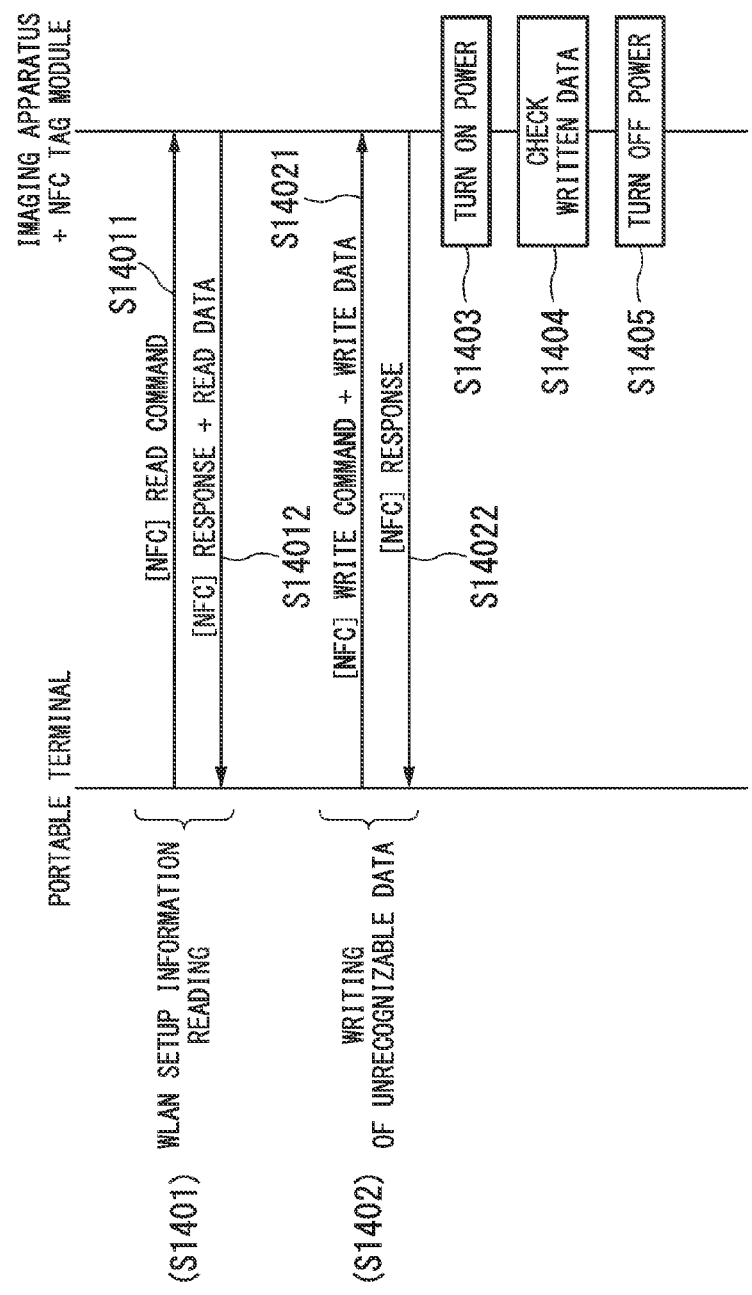
FIG. 17 is a sequence diagram illustrating operations of the portable terminal, the imaging apparatus, and the NFC tag module when the power of the imaging apparatus is in the OFF state and the imaging apparatus instruction command is an unrecognizable command in this embodiment.

FIG. 17 is a sequence diagram illustrating operations of the portable terminal 101, the imaging apparatus 201, and the NFC tag module 301 when the power of the imaging apparatus 201 is in the OFF state and the imaging apparatus instruction command is an unrecognizable command.

(Step S1401) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S14011). Subsequently, the imaging apparatus 201 and the NFC tag module 301 transmit a response and data (WLAN setup information) to the portable terminal 101 using the NFC (step S14012).

(Step S1402) The portable terminal 101 writes an unrecognizable imaging apparatus instruction command to the imaging apparatus 201 and the NFC tag module 301 using the NFC. Specifically, the portable terminal 101 transmits a write command and write data (unrecognizable imaging apparatus instruction command) to the imaging apparatus 201 and the NFC tag module 301 using the NFC (step S14021). Subsequently, the imaging apparatus 201 and the NFC tag module 301 transmit a response to the portable terminal 101 using the NFC (step S14022).

(Step S1403) The imaging apparatus 201 and the NFC tag module 301 turn on the power of the imaging apparatus 201 because the imaging apparatus 201 detects that the data has been written in the process of step S1402.

(Step S1404) The imaging apparatus 201 and the NFC tag module 301 check written data because the data has been written in the process of step S1402.

(Step S1405) Because the data checked in the process of step S1402 is the unrecognizable imaging apparatus instruction command, the imaging apparatus 201 and the NFC tag module 301 turn off the power of the imaging apparatus 201.

In this manner, when the process is necessary (for example, when the imaging apparatus instruction command has been written to the second memory 303 of the NFC tag module 301), the imaging apparatus 201 can turn on the power. In addition, when it is unnecessary to perform the process (for example, when the imaging apparatus instruction command written to the second memory 303 of the NFC tag module 301 is the unrecognizable command), the imaging apparatus 201 can turn off the power and does not ineffectually operate the WLAN communication module 203. Thus, it is possible to reduce power consumption.

Figure 18:
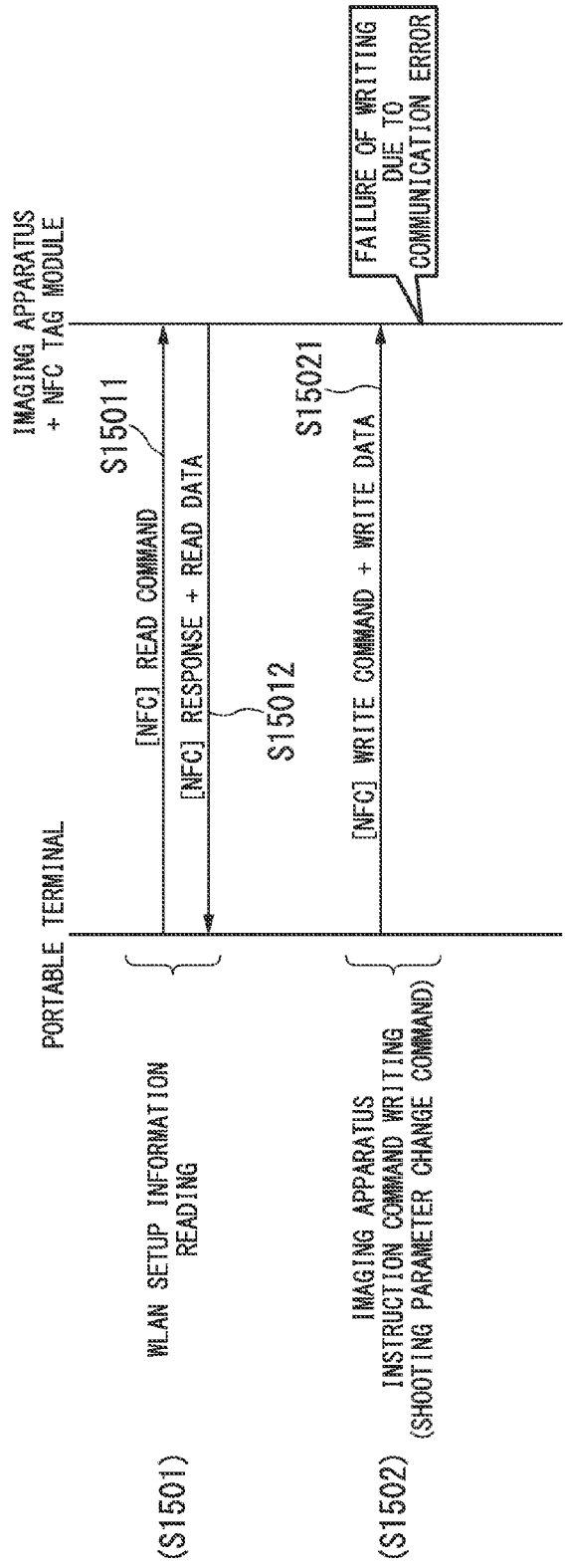
FIG. 18 is a sequence diagram illustrating operations of the portable terminal, the imaging apparatus, and the NFC tag module when the power of the imaging apparatus is in the OFF state and writing of the imaging apparatus instruction command, that is, the "WLAN AP activation command," fails in this embodiment.

FIG. 18 is a sequence diagram illustrating operations of the portable terminal 101, the imaging apparatus 201, and the NFC tag module 301 when the power of the imaging apparatus 201 is in the OFF state and writing of the imaging apparatus instruction command, that is, the "WLAN AP activation command," fails.

(Step S1501) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S15011). Subsequently, the imaging apparatus 201 and the NFC tag module 301 transmit a response command and data (WLAN setup information) to the portable terminal 101 using the NFC (step S15012).

(Step S1502) Although the portable terminal 101 writes an imaging apparatus instruction command, that is, a "WLAN AP activation command," to the imaging apparatus 201 and the NFC tag module 301 using the NFC, the writing fails. Specifically, the portable terminal 101 transmits a write command and write data (WLAN AP activation command) to the imaging apparatus 201 and the NFC tag module 301 using the NFC (step S15021). However, because the writing of the WLAN AP activation command has failed, the imaging apparatus 201 and the NFC tag module 301 do not turn on the power of the imaging apparatus 201.

In this manner, because the imaging apparatus 201 does not turn on the power of the imaging apparatus 201 and does not ineffectually operate the WLAN communication module 203 when no process is performed (for example, when writing by the portable terminal 101 to the second memory 303 of the NFC tag module 301 has failed), it is possible to reduce power consumption.

Figure 19:
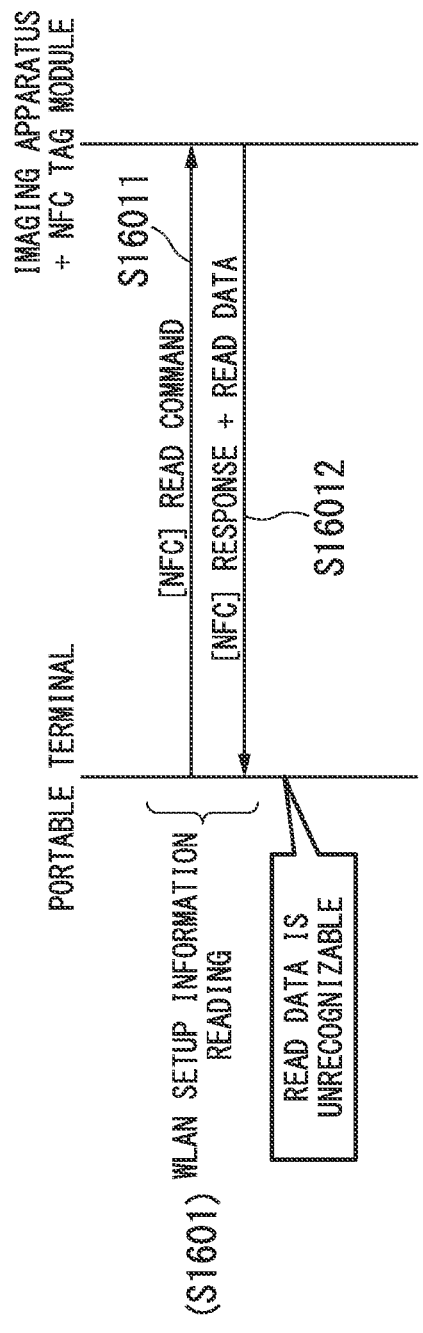
FIG. 19 is a sequence diagram illustrating operations of the portable terminal, the imaging apparatus, and the NFC tag module when the power of the imaging apparatus is in the OFF state and it is difficult to recognize data read from the imaging apparatus and the NFC tag module in the portable terminal in this embodiment.

FIG. 19 is a sequence diagram illustrating operations of the portable terminal 101, the imaging apparatus 201, and the NFC tag module 301 when the power of the imaging apparatus 201 is in the OFF state and it is difficult to recognize data read from the imaging apparatus 201 and the NFC tag module 301 in the portable terminal 101.

(Step S1601) The portable terminal 101 reads WLAN setup information from the imaging apparatus 201 and the NFC tag module 301 using NFC. Specifically, the portable terminal 101 transmits a read command to the imaging apparatus 201 and the NFC tag module 301 using the NFC (step S16011). Subsequently, the imaging apparatus 201 and the NFC tag module 301 transmit a response and data (WLAN setup information) to the portable terminal 101 using the NFC (step S16012). However, because it is difficult to recognize data read from the imaging apparatus 201 and the NFC tag module 301, the portable terminal 101 does not separately perform the process. In addition, because the portable terminal 101 performs no process, the imaging apparatus 201 also performs no process.

In this manner, because the imaging apparatus 201 does not turn on the power of the imaging apparatus 201 and does not ineffectually operate the WLAN communication module 203 when no process is performed (for example, when it is difficult for the portable terminal 101 to recognize data read from the second memory 303 of the NFC tag module 301), it is possible to reduce power consumption.

As described above, according to this embodiment, the control unit 105 of the portable terminal 101 reads data (written data) from the second memory 303 of the NFC tag module 301 using the NFC communication module 103 and detects whether the read data has a predetermined format. Then, when the data read from the second memory 303 of the NFC tag module 301 has the predetermined format and is WLAN setup data, the control unit 105 of the portable terminal 101 writes command data indicating that the AP function of the WLAN communication module 203 is activated to the second memory 303 of the NFC tag module 301 using the NFC communication module 103.

In addition, before the NFC communication with the NFC tag module 301 is impossible after written data is read from the second memory 303 of the NFC tag module 301, the control unit 105 of the portable terminal 101 writes command data to the second memory 303 of the NFC tag module 301.

In addition, the control unit 105 of the portable terminal 101 performs a connection process of wireless communication by the WLAN communication module 102 using WLAN setup data only when the writing of the command data to the second memory 303 of the NFC tag module 301 has succeeded.

In addition, the memory 104 of the portable terminal 101 records comparison data and the control unit 105 identifies whether the WLAN setup data is that of the imaging apparatus 201 based on comparison data, and writes command data for causing the imaging apparatus 201 to start the remote imaging function or command data for causing to browse image data held by the imaging apparatus 201 (that is, causing image data held by the imaging apparatus 201 to be shared) to the second memory 303 of the NFC tag module 301 when it is identified that the WLAN setup data is that of the imaging apparatus 201.

In addition, the first communication interface 205 of the imaging apparatus 201 and the second communication interface 302 of the NFC tag module 301 detect that command data has been newly written to the second memory 303 of the NFC tag module 301. In addition, the control unit 206 of the imaging apparatus 201 reads the written command data and executes a process according to the read command data when it is detected that the command data has been newly written to the second memory 303 of the NFC tag module 301, and sets the imaging module 202 to an unavailable state by turning off the power of the imaging apparatus 201 when there is an error in the read command data.

In addition, when there is no error in the command data written to the second memory 303 of the NFC tag module 301, the control unit 206 of the imaging apparatus 201 deletes the command data written to the second memory 303 of the NFC tag module 301 or writes data for discriminating whether a process according to the command data has been executed by the imaging apparatus 201 to the second memory 303 of the NFC tag module 301.

In addition, the control unit 206 of the imaging apparatus 201 writes WLAN setup data for use in the WLAN communication module 203 to the second memory 303 of the NFC tag module 301 and sets the imaging module to the unavailable state by turning off the power of the imaging apparatus 201 when there is an error in the read command data only after the WLAN setup data is written.

As described above, when the WLAN is necessary (for example, when the imaging apparatus instruction command, that is, the "WLAN AP activation command," has been written to the second memory 303 of the NFC tag module 301), the imaging apparatus 201 can operate the WLAN communication module 203.

In addition, because the imaging apparatus 201 does not ineffectually operate the WLAN communication module 203 when the WLAN is unnecessary, it is possible to reduce power consumption. As the case in which the WLAN is unnecessary, for example, there is a case in which an imaging apparatus instruction command in which the WLAN does not need to be used is written to the second memory 303 of the NFC tag module 301. In addition, for example, there is a case in which the imaging apparatus instruction command is not written to the second memory 303 of the NFC tag module 301. In addition, for example, there is a case in which data written to the second memory 303 of the NFC tag module 301 is an unrecognizable imaging apparatus instruction command. In addition, for example, there is a case in which writing to the second memory 303 of the NFC tag module 301 by the portable terminal 101 fails. In addition, for example, there is a case in which it is difficult for the portable terminal 101 to recognize data read from the second memory 303 of the NFC tag module 301.

In addition, when the process is necessary, the imaging apparatus 201 can turn on the power of the imaging apparatus 201. As the case in which the process is necessary, for example, there is a case in which the imaging apparatus instruction command is written to the second memory 303 of the NFC tag module 301.

In addition, when the process is not performed, the imaging apparatus 201 does not turn on the power of the imaging apparatus 201. As the case in which the process is not performed, for example, there is a case in which no data is written to the second memory 303 of the NFC tag module 301. In addition, for example, there is a case in which writing to the second memory 303 of the NFC tag module 301 by the portable terminal 101 fails. In addition, for example, there is a case in which it is difficult for the portable terminal 101 to recognize the data read from the second memory 303 of the NFC tag module 301.

In addition, the imaging apparatus 201 can turn off the power when it is not necessary to perform the process. As the case in which it is not necessary to perform the process, for example, there is a case in which the imaging apparatus instruction command written to the second memory 303 of the NFC tag module 301 is an unrecognizable command.

All or some of the functions of the units provided in the above-described portable terminal 101, all or some of the functions of the units provided in the above-described imaging apparatus 201, and all or some of the functions of the units provided in the above-described NFC tag module 301 may be implemented by recording a program for implementing the functions on a computer-readable recording medium and causing a computer system to read and execute the program recorded on the recording medium.

Also, the "computer system" used here is assumed to include an operating system (OS) and hardware such as peripheral devices.

In addition, the computer-readable recording medium refers to a storage apparatus, including a flexible disk, a magneto-optical disc, a read only memory (ROM), a portable medium such as a compact disc (CD)-ROM, and a hard disk embedded in the computer system. Further, the "computer-readable recording medium" is assumed to include a computer-readable recording medium for dynamically holding a program for a short time as in a communication line when the program is transmitted via a network such as the Internet or a communication circuit such as a telephone circuit and a computer-readable recording medium for holding the program for a predetermined time as in a volatile memory inside the computer system including a server and a client when the program is transmitted. In addition, the above-described program may be used to implement some of the above-described functions. Further, the program may implement the above-described functions in combination with a program already recorded on the computer system.

Although the embodiments of the present invention have been described in detail above with reference to the drawings, specific configurations are not limited to the embodiments, and a design, etc. may also be included without departing from the scope of the present invention. For example, although the imaging apparatus 201 and the NFC tag module 301 are separated in the above-described embodiment, the NFC tag module 301 may be embedded in the imaging apparatus 201.

What is claimed is:

1. An imaging apparatus having an imaging module and an integrated circuit (IC) tag connection port, the imaging apparatus comprising:
    a detection unit configured to detect that command data is newly written to an IC tag having a wired connection to the IC tag connection port; and
    a control unit configured to read the written command data and execute a process according to the read command data when it is detected that the command data is newly written to the IC tag and set the imaging module to an unavailable state when there is an error in the read command data.

2. The imaging apparatus according to claim 1, wherein, when there is no error in the command data, the control unit executes a process according to the read command data and deletes the command data written to the IC tag or writes data for discriminating whether the process according to the command data is executed by the imaging apparatus to the IC tag.

3. The imaging apparatus according to claim 1, wherein the control unit writes WLAN setup data for use in a WLAN communication module configured to perform wireless communication in a WLAN to the IC tag connected to the IC tag connection terminal and sets the imaging module to an unavailable state when there is an error in the read command data only after the WLAN setup data is written.

4. A computer readable storage device saving a computer program for causing an imaging apparatus having an imaging module and an integrated circuit (IC) tag connection port to execute:
    a detection step of detecting that command data is newly written to an IC tag having a wired connection to the IC tag connection port; and
    a setting step of reading the written command data and executing a process according to the read command data when it is detected that the command data is newly written to the IC tag and setting the imaging module to an unavailable state when there is an error in the read command data.

5. An imaging apparatus having an imaging module, an integrated circuit (IC) tag connection port, and a CPU, wherein
    the IC tag connection port is wired connected to an IC tag,
    the CPU is wired connected to the IC tag connection port, and
    when the CPU detects that the command data is newly written to the IC tag,
    the CPU reads the written command data and executes a process according to the read command data, and when there is an error in the read command data, the CPU sets the imaging module to an unavailable state.

6. A setting method of an imaging apparatus having an imaging module and an integrated circuit (IC) tag connection port, the setting method comprising:
    a detection step of detecting that command data is newly written to the IC tag having a wired connection to the IC tag connection port; and
    a setting step of, when it is detected that the command data is newly written to the IC tag,
    reading the written command data and executing a process according to the read command data, and when there is an error in the read command data, setting the imaging module to an unavailable state.

7. An imaging apparatus having an imaging module and an integrated circuit (IC) tag connection port, the imaging apparatus comprising:
    a memory; and
    a processor configured to detect that command data is newly written to an IC tag having a wired connection to the IC tag connection port; and read the written command data and execute a process according to the read command data when it is detected that the command data is newly written to the IC tag and set the imaging module to an unavailable state when there is an error in the read command data.

8. The imaging apparatus according to claim 7, wherein, when there is no error in the command data, the processor executes a process according to the read command data and deletes the command data written to the IC tag or writes data for discriminating whether the process according to the command data is executed by the imaging apparatus to the IC tag.

9. The imaging apparatus according to claim 7 wherein the processor writes WLAN setup data for use in a WLAN communication module configured to perform wireless communication in a WLAN to the IC tag connected to the IC tag connection terminal and sets the imaging module to an unavailable state when there is an error in the read command data only after the WLAN setup data is written.

* * * * *